US005937415A

United States Patent [19]

Sheffield et al.

[11] Patent Number: 5,937,415
[45] Date of Patent: Aug. 10, 1999

[54] DATA BASE DEVELOPMENT SYSTEM WITH METHODS FACILITATING COPYING OF DATA FROM ONE DATA SOURCE TO ANOTHER

[75] Inventors: Kim A. Sheffield, Groton; Alan L. Preston, Arlington, both of Mass.

[73] Assignee: Sybase, Inc., Emeryville, Calif.

[21] Appl. No.: 08/763,467

[22] Filed: Dec. 11, 1996

Related U.S. Application Data

[60] Provisional application No. 60/008,598, Dec. 13, 1995.

[51] Int. Cl.$^6$ .................................................. G06F 17/30
[52] U.S. Cl. ........................ 707/204; 707/201; 707/200; 707/102; 707/4; 707/526; 345/339
[58] Field of Search ............................... 707/4, 102, 200, 707/201, 204, 526; 345/339

[56] References Cited

U.S. PATENT DOCUMENTS

| | | | |
|---|---|---|---|
| 5,121,477 | 6/1992 | Koopmans et al. ..................... | 395/156 |
| 5,148,154 | 9/1992 | MacKay et al. ......................... | 340/712 |
| 5,179,652 | 1/1993 | Rozmanith et al. ..................... | 395/155 |
| 5,204,947 | 4/1993 | Bernstein et al. ....................... | 395/157 |
| 5,293,615 | 3/1994 | Amada ..................................... | 395/600 |
| 5,396,616 | 3/1995 | Venable et al. .......................... | 395/500 |
| 5,420,981 | 5/1995 | Ivie et al. ................................. | 395/200 |
| 5,560,038 | 9/1996 | Haddock .................................. | 395/800 |
| 5,566,330 | 10/1996 | Sheffield ................................. | 395/600 |
| 5,655,140 | 8/1997 | Haddock ............................ | 395/200.76 |
| 5,664,182 | 9/1997 | Nierenberg et al. ..................... | 707/102 |
| 5,701,479 | 12/1997 | Venable et al. .......................... | 395/670 |

OTHER PUBLICATIONS

"*How to Use Goldengate®, User's Guide*", vol. 1–2, table of contents, §§ 1, 7, 17 (pp. 1–4, 13–14, 41–53, 58–73), 18 (pp. 1–3, 6, 26–32, 37–44), 19(pp. 1–5, 19–20, 22–23), 1987, Cullinet PC Software, Inc., 400 Blue Hill Drive, Westwood, MA 02090.

Czejdo et al, "Integration of Database Systems and Smalltalk", Symposium on Applied Computing, 3–5 Apr. 1991, pp. 393–402.

Theimer et al, "*QuickSilver Support for Access to Data in Large, Geographically Dispersed Systems*", 9th International Conference on Distributed Computing, Jun. 5–9 1989, pp. 28–35.

NeXT Computer, Inc. brochure (May 1991).

NeXT Computer, Inc., NeXT on Campus™ brochure, p. 19 (Jan. 1991).

NeXT Computer, Inc., Software and Peripherals brochure, pp. 7–8 (Mar. 1991).

NeXT Computer, Inc., Spring 1991 List Prices brochure (Apr. 1991).

Gupta Technologies Inc., SQLWindows Technical Reference Manual, Chapter 3.

NeXT Computer, Inc., The NeXTstep® User Interface brochure (1990).

*Primary Examiner*—Paul V. Kulik
*Assistant Examiner*—Jean M. Corrielus
*Attorney, Agent, or Firm*—John A. Smart

[57] ABSTRACT

A Client/Server Database System with improved methods for performing database queries, particularly DSS-type queries, is described. The system includes one or more Clients (e.g., Terminals or PCs) connected via a Network to a Server. In general operation, Clients store data in and retrieve data from one or more database tables resident on the Server by submitting SQL commands, some of which specify "queries"—criteria for selecting particular records of a table. The system implements a "Data Pipeline" feature for programming replication of data from one database to another in client applications. Specifically, a pipeline object and SQL SELECT statement are built using a Pipeline Painter. The Data Pipeline lets a user (developer) easily move data from a high-end database server (e.g., Sybase) to a local database (Watcom SQL), all without the user having to issue SQL commands. The pipeline object facilitates moving data from one database management system to another, or between databases of the same type.

9 Claims, 31 Drawing Sheets

Microfiche Appendix Included
(1 Microfiche, 54 Pages)

Script for Clicked event of the cb_new CommandButton

```
//////////////////////////////////////////////////////////////
// To begin, check whether user did any typing in dw_detail /
// DataWindow contr                                         /
// will be lost if  /////////////////////////////////////////
//                  //                                      /
// We've coded a wi //   If the user clicks the right mouse button while the
// wf_warndataloss) //   pointer is on the window itself (but not on a control),
//////////////////  //   then display a popup menu. The popup menu we want to
                    //   display for the Customer window consists of the m_guide
IF wf_warndataloss( //   portion of the m_custmenu menu that we already display /
                    //   in the window's menu bar.                              /
    RETURN          //                                                          /
END IF              //   First, determine the current position (x and y coordinates)
                    //   of the pointer.
////////////////////
//                    integer li_x, li_y
// Next, some init
//                    li_x = PointerX ()
////////////////////  li_y = PointerY ()
    // Reset the
    // disable i      //   Now, display the m_guide menu as a popup menu at the current
dw_list.Reset()       //   pointer location.
dw_list.enabled = false
                      m_custmenu.m_guide.PopMenu ( li_x, li_y )
sle_lname.text = ""

...
```

Script for RButtonDown event of the w_customer window

Script for Clicked event of the m_about menu item

```
//  Display a modal (response) window that presents the
//  user with information about this application.

Open (w_about_ord)
```

FIG. 11A

```
// This script uses embedded SQL to find the highest Cust_Id
// currently stored in the database. It then adds 1 to that
// number to provide the Id for a new customer.

integer li_fetched_id = 0

SELECT Max("customer"."cust_id" )
    INTO :li_fetched_id
    FROM "customer"
    USING sqlca;

IF sqlca.sqlcode >= 0 THEN

IF IsNull(li_fetched_id) THEN
        li_fetched_id = 0
    END IF li_fetched_id ++

ELSE li_fetched_id = -1

END IF
```

↑ EMBEDDED SQL STATEMENT

POWERSCRIPT STATEMENTS

```
// This function uses embedded SQL to see if the customer to
// be deleted has any orders in the database.  It takes one
// argument -- the customer's ID number.
//
//      Return values:
//      * If no orders, then 0
//      * If orders, then that number
//      * If error, then -1 integer li_fetched_count = 0

SELECT Count("order_header"."order_id")
    INTO :li_fetched_count
    FROM "order_header"
    WHERE "order_cust_id" = :ai_custid
    USING sqlca;

IF sqlca.sqlcode = -1 THEN li_fetched_count = -1

RETURN li_fetched_count
```

DATA BASE DEVELOPMENT SYSTEM WITH METHODS FACILITATING COPYING OF DATA FROM ONE DATA SOURCE TO ANOTHER

This application claims priority from provisional application Ser. No. 60/008,595, entitled CLIENT/SERVER DATABASE SYSTEM WITH METHODS FOR PIPELINE TRANSFER OF DATA BETWEEN DATA SOURCES, filed Dec. 13, 1995, now pending, the disclosure of which is hereby incorporated by reference.

MICROFICHE APPENDIX

A single-fiche Microfiche Appendix, containing 54 frames, is included with this application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to processing of queries against information stored in a data processing system, such as an SQL Relational Database Management System (RDBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee. Here, each record contains fields designating specifics about the employee, such as name, home address, salary, and the like.

Between the actual physical database itself (i.e., the records contained in data pages stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly in the area of database query performance.

Traditionally, database management systems (e.g., the above-described client/server database systems) have been employed for on-line transaction processing (OLTP)—posting data (from transactions) to a database table. As part of this process of putting data "in" a database, OLTP systems typically process queries which find a single record, or just a few records. A typical query in an OLTP system, for instance, might be to retrieve data records for a particular customer, such as retrieving records in an airline reservation system for Account No. 35. Thus, use of OLTP systems for retrieving data has been largely limited to moment-to-moment operational needs, where the queries are relatively simple and the number of rows retrieved (relative to table size) is few. In other words, OLTP systems have been optimized for this task of finding a "needle in a haystack"—that is, finding one or few records which meet a given query condition.

What is needed are system and methods with better DSS performance, yet within the traditional SQL/relational model—a model which users demand. From the perspective of users, such a system should appear to be essentially an SQL-based relational system. At the same time, however, such a system should yield much-improved DSS performance. The present invention fulfills this and other needs.

SUMMARY OF THE INVENTION

A Client/Server Database System with improved methods for performing data transfers is described. The system includes one or more Clients (e.g., Terminals or PCs) connected via a Network to a Server. In general operation, Clients store data in and retrieve data from one or more database tables resident on the Server by submitting SQL commands, some of which specify "queries"—criteria for selecting particular records of a table.

The system implements a "Data Pipeline" feature for programming replication of data from one database to another in client applications. Specifically, a pipeline object and SQL SELECT statement are built using a Pipeline Painter. The Data Pipeline lets a user (developer) easily move data from a high-end database server (e.g., Sybase) to a local database (Watcom SQL), all without the user having to issue SQL commands. The pipeline object facilitates moving data from one database management system to another, or between databases of the same type.

A method of the present invention for copying (or moving) data from a source data source to a destination data source, comprises selecting source and destination database profiles for the source and destination data sources, each profile comprising sufficient information for supporting a connection to a respective one of the data sources, establishing a connection to the source and destination data sources, displaying a graphical user interface for graphically defining a pipeline object, the pipeline object specifying copying of data from the source data source to the destination data source, saving the pipeline object to a storage device, and copying data from the source data to the destination data by executing the pipeline object.

BRIEF DESCRIPTION OF THE DRAWINGS

FIG. 11A is a diagram illustrating use of script or procedural code, for responding to events which occur in the system.

FIGS. 11B–C are diagrams illustrating scripts which include comments, variable declarations, executable statements, and embedded SQL statements.

FIG. 11D is a diagram illustrating a script function employing embedded SQL.

FIG. 15A is a bitmap screen shot illustrating a user interface dialog for initiating execution of a data pipeline.

FIG. 15B is a bitmap screen shot illustrating a user interface dialog for specifying retrieval arguments for a data pipeline's execution.

FIG. 16 is a bitmap screen shot illustrating modification of the dialog of FIG. 15A, for indicating error rows which occur during execution of the data pipeline.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
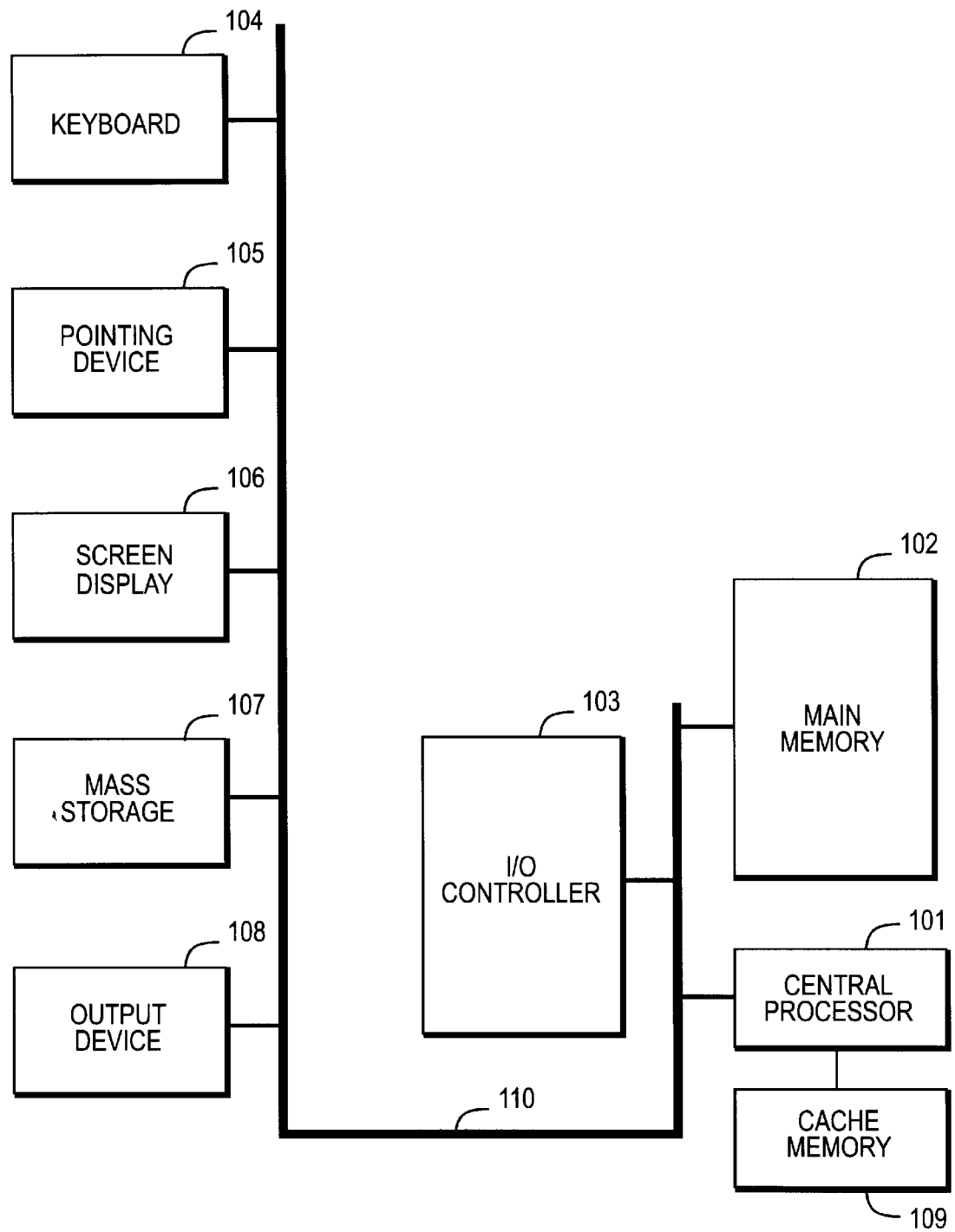
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
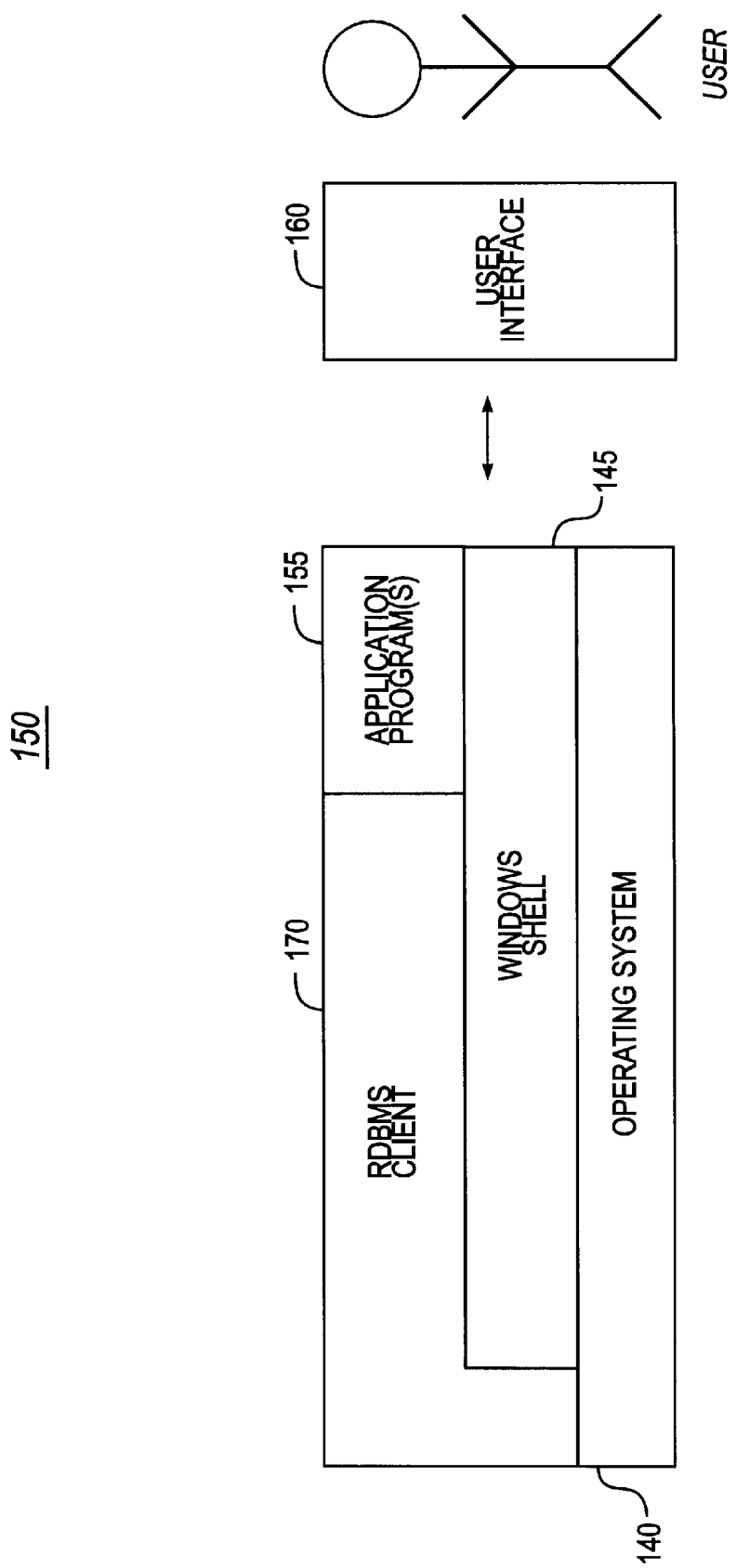
FIG. 1B is a block diagram of a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing database tables from an SQL database server operating in a Client/Server environment. In a most-preferred embodiment, RDBMS client comprises PowerBuilder Enterprise 4.0 for Windows, available from Powersoft of Concord, Mass. (Part No. PB001010V4), a wholly-owned subsidiary of Sybase, Inc. Description of PowerBuilder can be found in the manuals accompanying PowerBuilder Enterprise; additional description can be found in application Ser. No. 08/393,049, filed Feb. 23, 1995, now pending. The disclosures of each of the foregoing are hereby incorporated by reference.

Client/Server Database Management System

A. General

Figure 2:
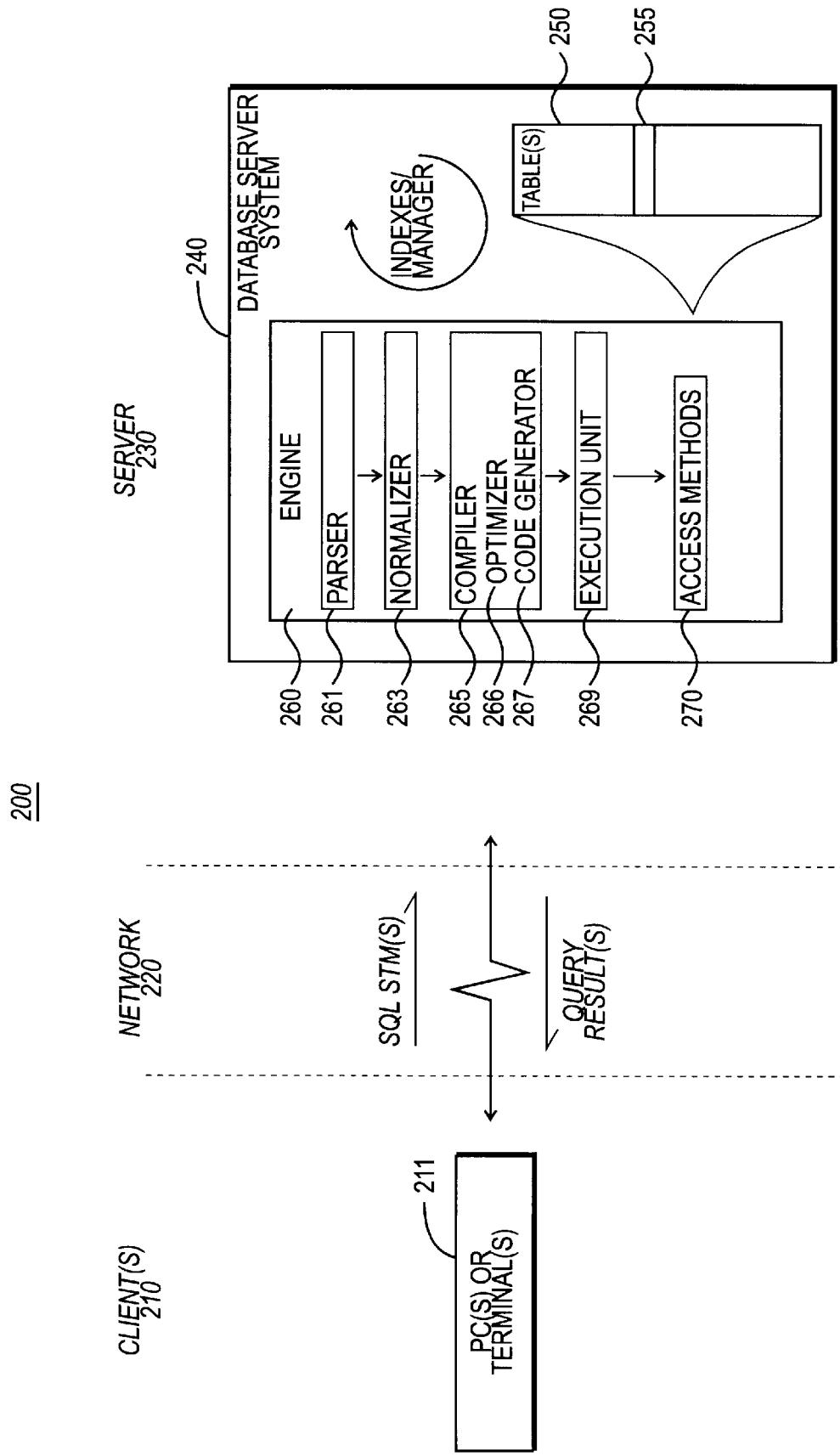
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, Utah), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record -includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Client(s) issue one or more SQL commands to the Server. SQL commands may specify, for instance, a query for retrieving particular data (i.e., data records meeting the query condition) from the table 250. The syntax of SQL (Structured Query Language) is well documented; see, e.g., the above-mentioned *An Introduction to Database Systems*. In addition to retrieving the data from Database Server tables, the Client(s) also include the ability to insert new rows of data records into the table; Client(s) can also modify and/or delete existing records in the table.

For enhancing the speed in which the Database Server stores, retrieves, and presents particular data records, the Server maintains one or more database indexes on the table, under control of an Index Manager. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via Network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer 263 performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods 270 being invoked during query execution.

The Code Generator 267, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. The Access Methods operate in conjunction with multiple Buffer Managers to access the data (described in detail in commonly-owned application Ser. No. 08/554,126, filed Nov. 6, 1995, and hereby incorporated by reference), as required by the query plan. After the plan has been executed by the Execution Unit, the Server returns a query result or answer table back to the Client(s).

B. Designing an application in an integrated development environment

Before describing how to use a data "pipeline" of the present invention in detail, it is first helpful to review the task of designing an application in the integrated development environment (i.e., PowerBuilder™) provided in the system of the present invention.

1. Requirements

One of the keys to successful application development (in PowerBuilder or any other development environment) is designing what a user is going to build before he/she begins building it. The way to start this design phase is to determine the detailed requirements that a user's application must meet to satisfy the needs of the ultimate end users.

Determining requirements entails figuring out, in real-world terms, what the application is to do when someone uses it. A user's goal should be to specify: A conceptual walk-through of the application, from the point when users start it to the point when they exit from it, and one or more perspectives of the application's composition, such as by flow, by components, by dependencies, or by usage.

To figure out the requirements of a typical client/server application, it is helpful to break them down into several different categories:

(1) Data access—Which database tables the application needs to use for its data input and output. Which basic database operations (create, retrieve, update, delete) the application needs to perform on these tables.

(2) User interface—How the application is to present this data to users. How users are to interact with the application to view the data, manipulate it, and navigate through the application's various displays.

(3) Processing—What the application is to do with the data to prepare it for display to the user or update to the database tables. What the flow of control is to be as the application performs its various operations.

(4) Program interaction—What data sharing (if any) the application needs to do with other programs. What additional services (if any) the application must get through the execution of other programs.

(5) Output—What reports the application needs to print and how it is to format them. What other materials (such as files) the application is to generate as a byproduct of its processing.

2. Sample application

Consider an Order Entry application for a hypothetical company, Anchor Bay Nut Company. Representative requirements necessary for such an application include the following.

Figure 3A:
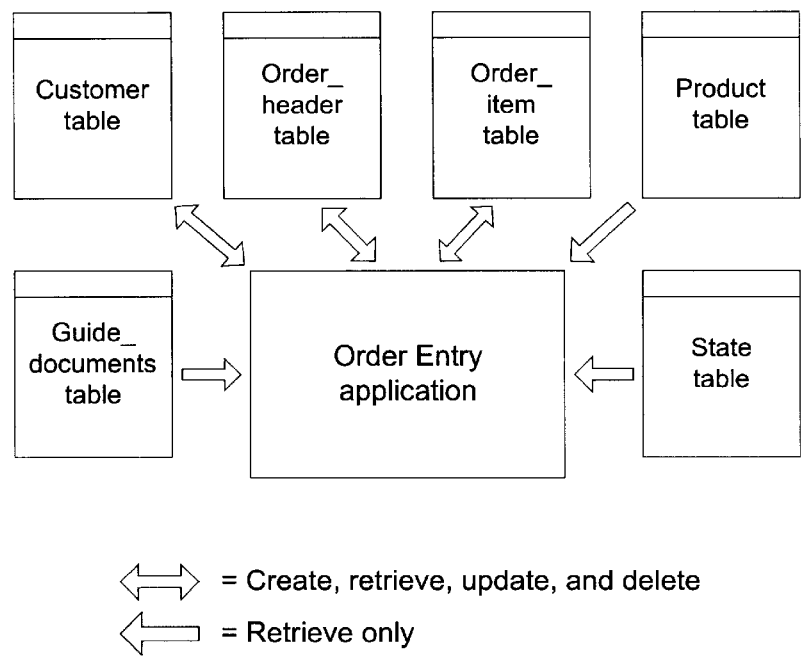
FIG. 3A is a block diagram illustrating data access in the system using a sample "order entry" application.
Figure 3B:
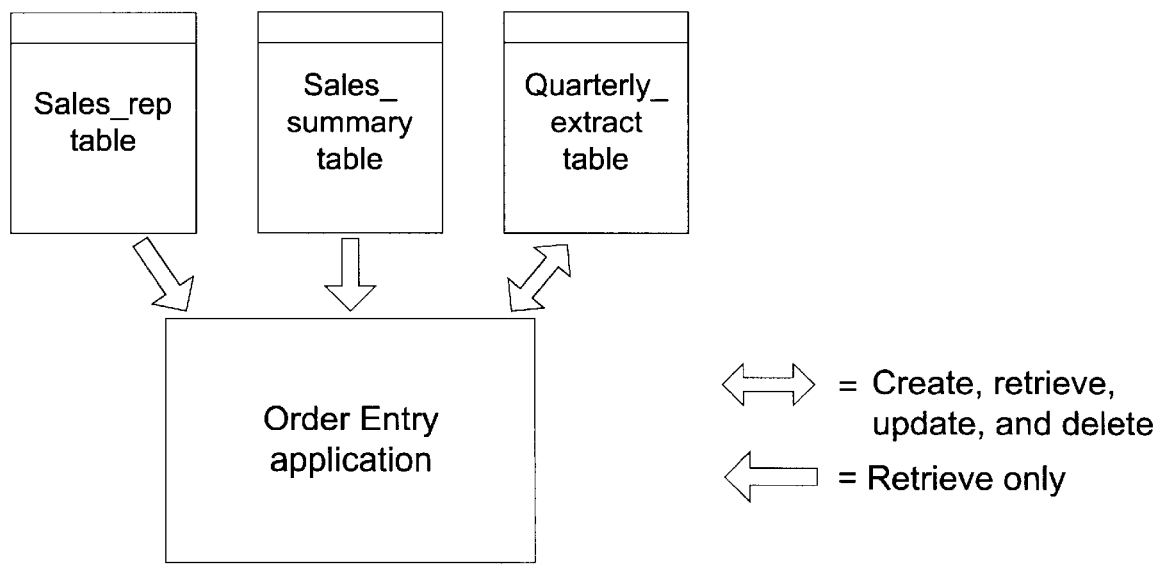
FIG. 3B is a block diagram illustrating data access to different database tables (e.g., residing on a server) for the order entry application.

(1) Data access—As illustrated in FIG. 3A, the Order Entry application needs to access the company's main database (e.g., ANCHRBAY.DB) from the server so that it can use these tables. As illustrated in FIG. 3B, the application also needs to access the company's sales database (e.g., ABNCSALE.DB) from the server so that it can use these tables.

(2) User interface—The Order Entry application needs to present major displays with which the user is to interact: One for viewing (retrieving) and maintaining (creating, updating, deleting) customer data in the Customer database table, and one for viewing and maintaining order data in the Order_header and Order_detail database tables. In the course of supporting these customer and order maintenance activities, the application must also present a number of more minor displays (such as for logging on to the databases, soliciting choices from the user, displaying messages, and more).

Figure 4A:
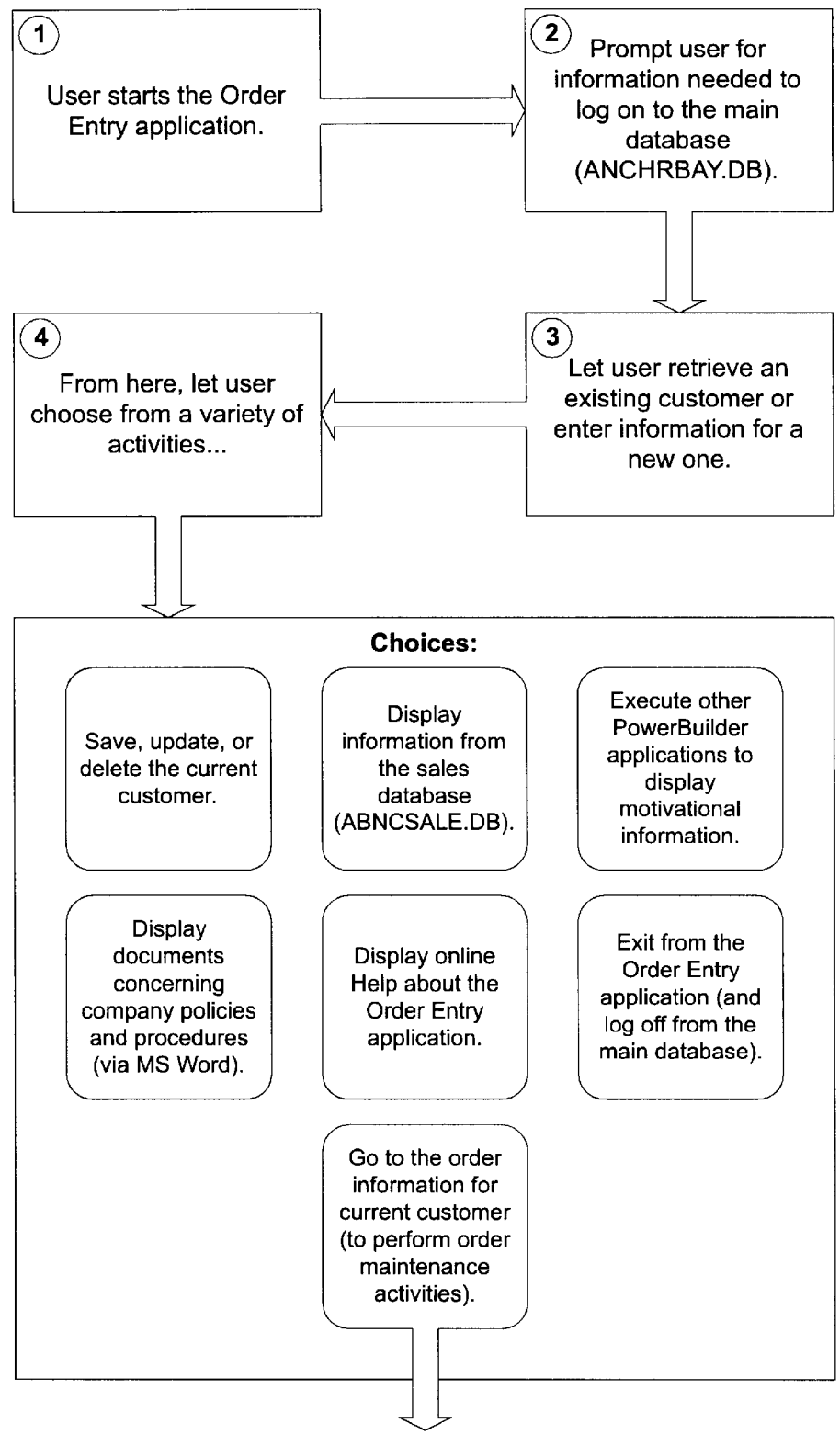
FIGS. 4A–B represent a flow diagram illustrating processing which occurs in the order entry application.
Figure 4B:
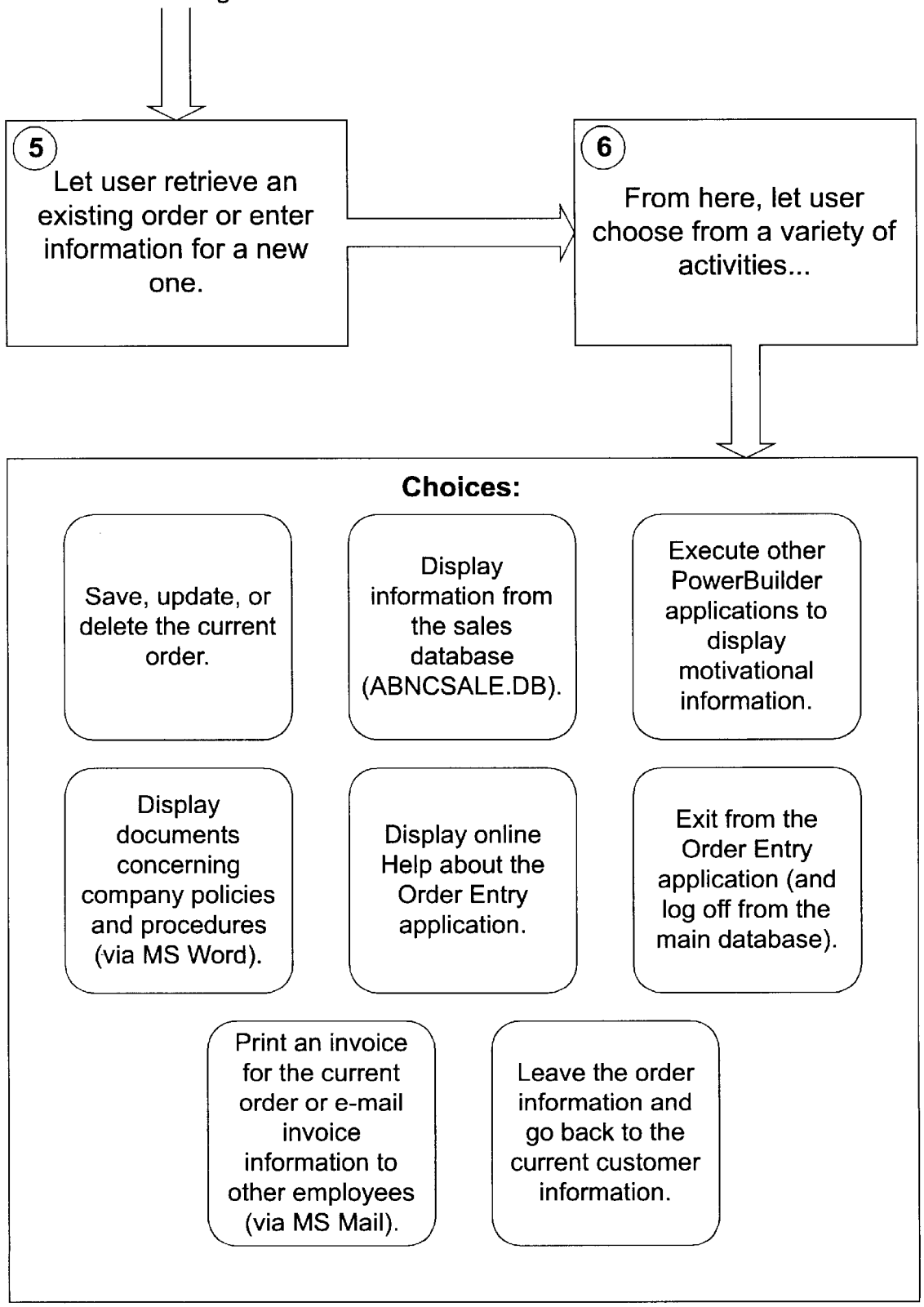

(3) Processing—FIGS. 4A–B represent the basic flow of processing that the user encounters when navigating through the sample Order Entry application (ignoring many of its supporting activities for the sake of simplicity).

(4) Program interaction—In support of its customer and order maintenance activities, the Order Entry application also needs to access some external programs, including: a text editor program (e.g., Microsoft Word) to let the user view documents concerning company policies and procedures; an electronic mail program (e.g., Microsoft Mail) to let the user send order invoices to other employees; and other existing applications (e.g., that were created with PowerBuilder) to display motivational information to the user.

Figure 4C:
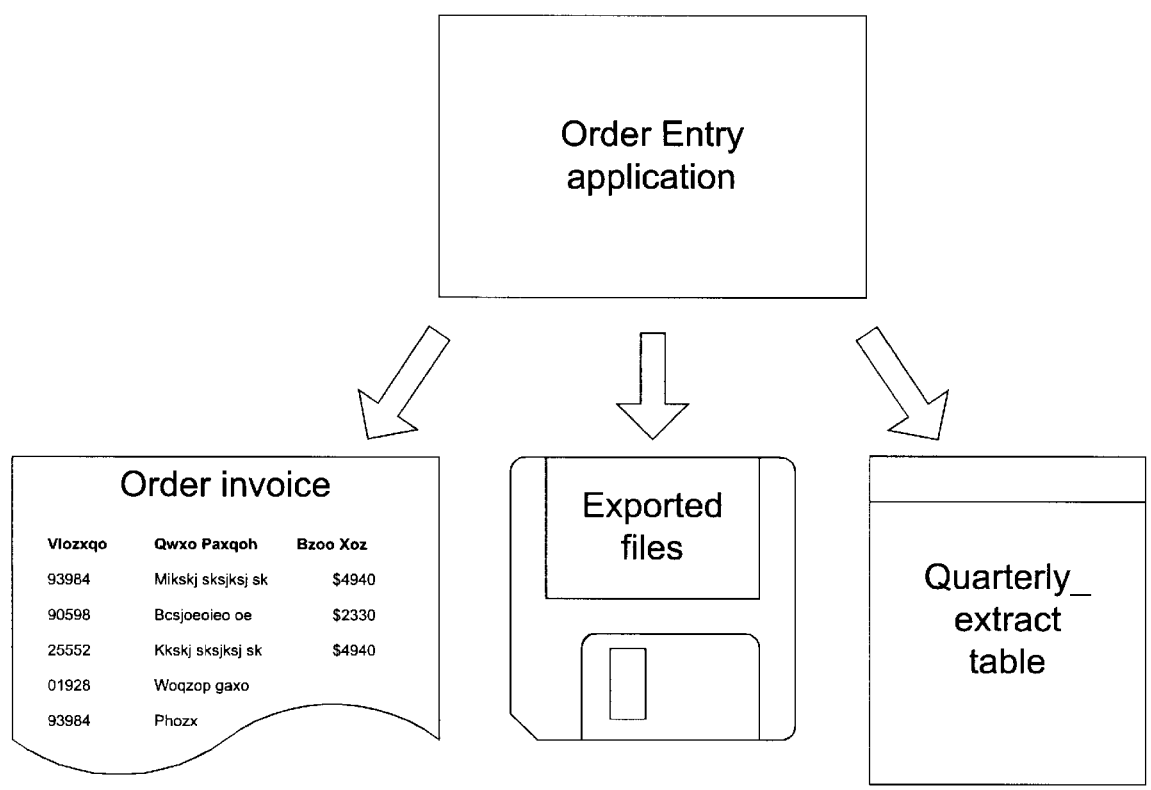
FIG. 4C is a block diagram illustrating various kinds of output which can be generated from the order entry application.

(5) Output—The Order Entry application should also produce various kinds of output when requested by the user. As illustrated in FIG. 4C, exemplary outputs includes printing an invoice for a particular order; exporting customer or order data to a file (using any one of several different file formats); and extracting quarterly data from the Sales_rep and Sales_summary tables of the sales database and storing that data in a new table (e.g., named Quarterly_extract).

Once a user knows the detailed requirements that his/her application must meet, a user then maps them to features that the development environment provides. This portion of the design phase includes specifying the accessing of data (e.g., by servers and other data sources); implementing the user interface (e.g., windows and controls); controlling the application's processing (e.g., events and scripts); extending the application's processing (e.g., external programs); and routing application output (e.g., reports, files, and "pipelines").

3. Accessing data: servers and other data sources

Figure 5A:
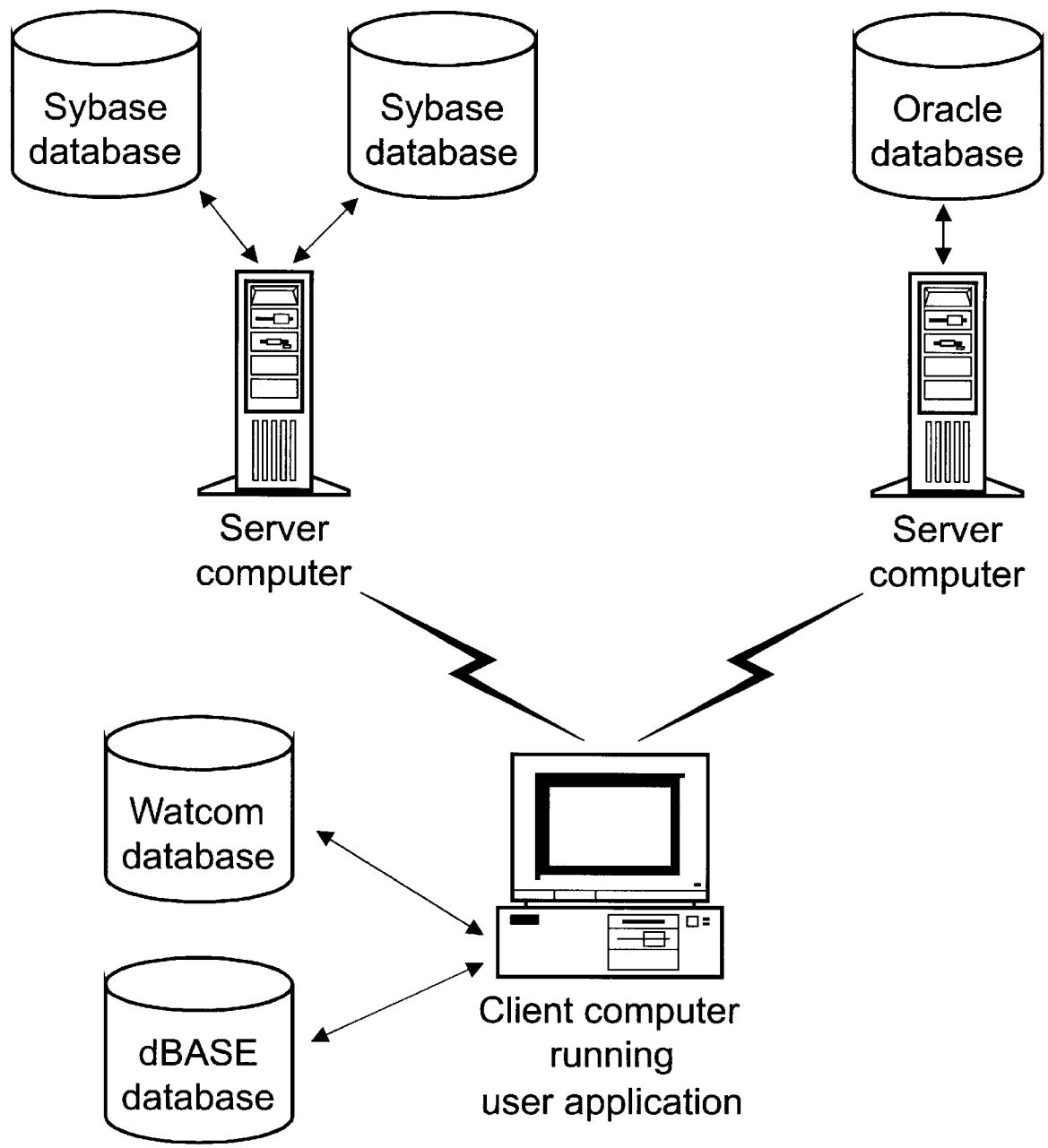
FIG. 5A is a block diagram illustrating that information in a client/server environment can be stored in different places (i.e., different servers) and in different formats (e.g., from a variety of different vendors).

The requirements of an application typically require access to at least one table and, typically, access to several tables. Often in a client/server environment, such tables are in different places and different formats. As illustrated in FIG. 5A, tables may be stored in one or more databases; those databases may be located in a variety of locations—on the client computer, on one or more server computers, or on a mix, with each of those databases implemented under a variety of DBMSs (database management systems).

The development environment provides an approach to data access that enables a user to successfully handle this potential database diversity in the applications a user builds. It does this by separating the DBMS-specific aspects of data access from an application to make it as independent as possible. This means a user can focus on the logical use of a table in his/her application instead of how that table is implemented in one particular database or another.

Figure 5B:
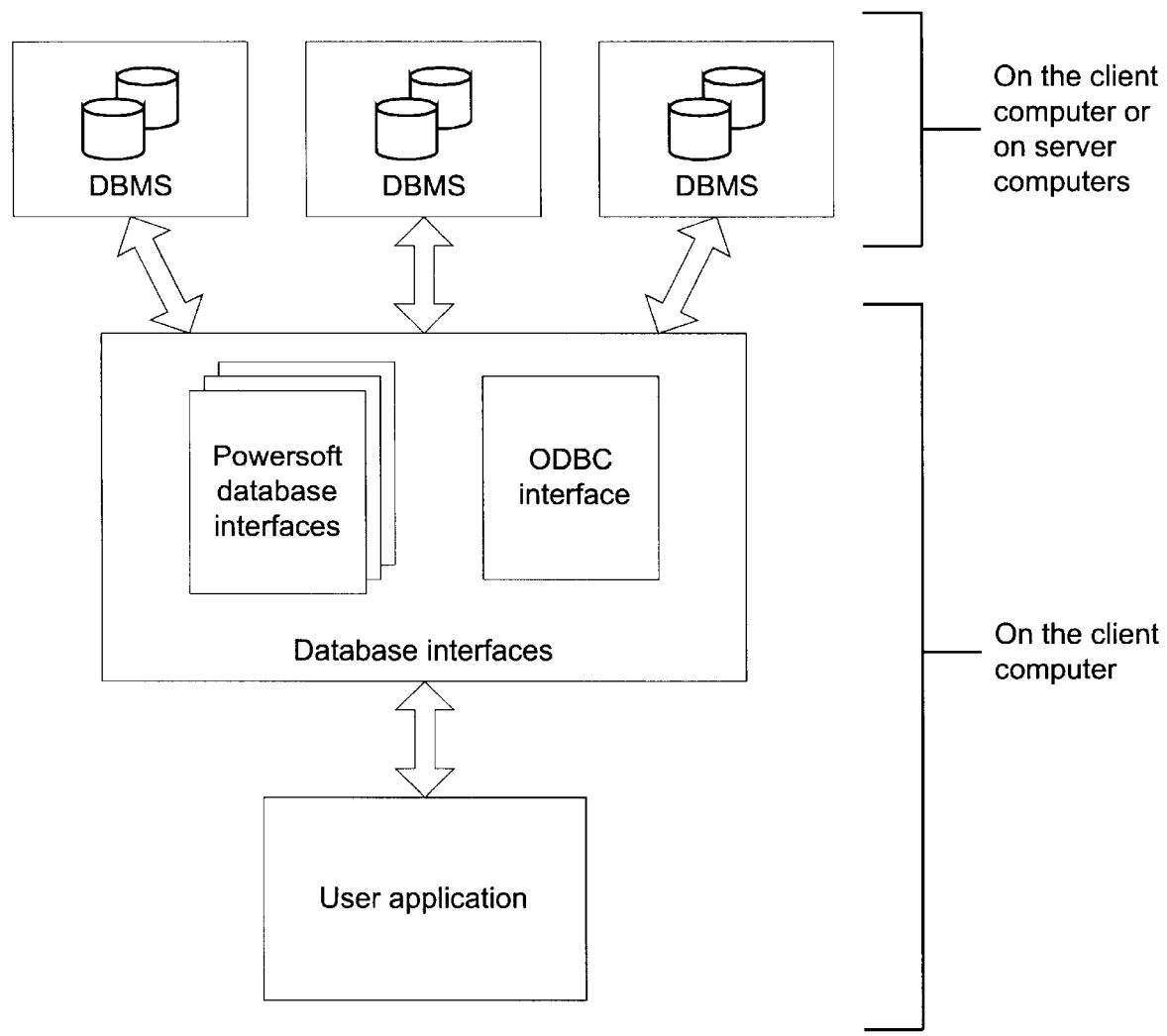
FIG. 5B is a block diagram illustrating a separate software layer—database interfaces—employed in the system for handling DBMS specific operations.

As illustrated in FIG. 5B, the development environment handles DBMS specifics in a separate software layer—database interfaces—that a user installs on the client computer along with his/her application. This layer consists of various database interfaces, each of which knows how to talk to a particular kind of DBMS and how to take advantage of the unique features of that DBMS. When a user's application requests any kind of access to a database, it relies on the appropriate database interface (depending on the DBMS for that database) to carry out the operation.

In an exemplary embodiment, two different kinds of database interfaces are provided for a user's application to use: Microsoft ODBC interface and Powersoft database interfaces. ODBC is the Open Database Connectivity API (application programming interface) developed by Microsoft to give applications standardized access to diverse data sources (which are usually databases, but can also be other kinds of files such as spreadsheets or text files). A user will design his/her application to use this interface if he/she wants to access one or more ODBC-compliant databases. For a database that is not ODBC-compliant, the development environment offers a variety of native interfaces, each of which knows how to talk to a specific DBMS (such as SQL Server or Oracle). If a user wants to access a SQL Server database, for example, a user will design his/her application to use the Powersoft SQL Server interface.

A user can design his/her application to use any combination of these database interfaces. The major benefit of this layered approach to data access is that it helps insulate a user's application from the complicated and potentially dynamic logistics of the typical client/server environment. As a result, the data access a user designs into his/her application is independent of a database's location or DBMS. Adapting a user's application to such changes can often be just a matter of pointing it to the database's new location and database interface. Additionally with the approach, a user can work with all of the tables in his/her application in the same way-using the same table-processing features—regardless of the DBMSs that are involved. Even in cases where a user wants to take advantage of capabilities unique to certain DBMSs (such as stored procedures, outer joins, referential integrity checking), a user will still use consistent techniques to do so.

Figure 6A:
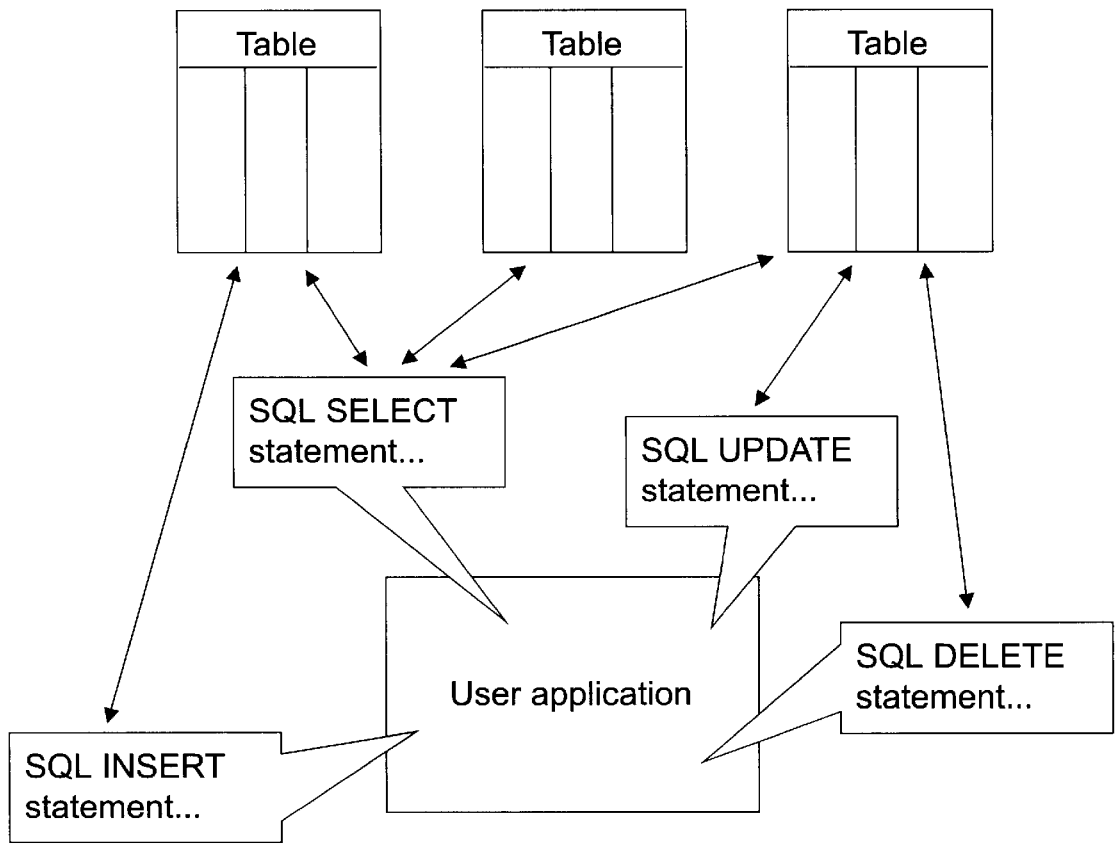
FIG. 6A is a block diagram illustrating use of embedded SQL within a user's application.
Figure 6B:
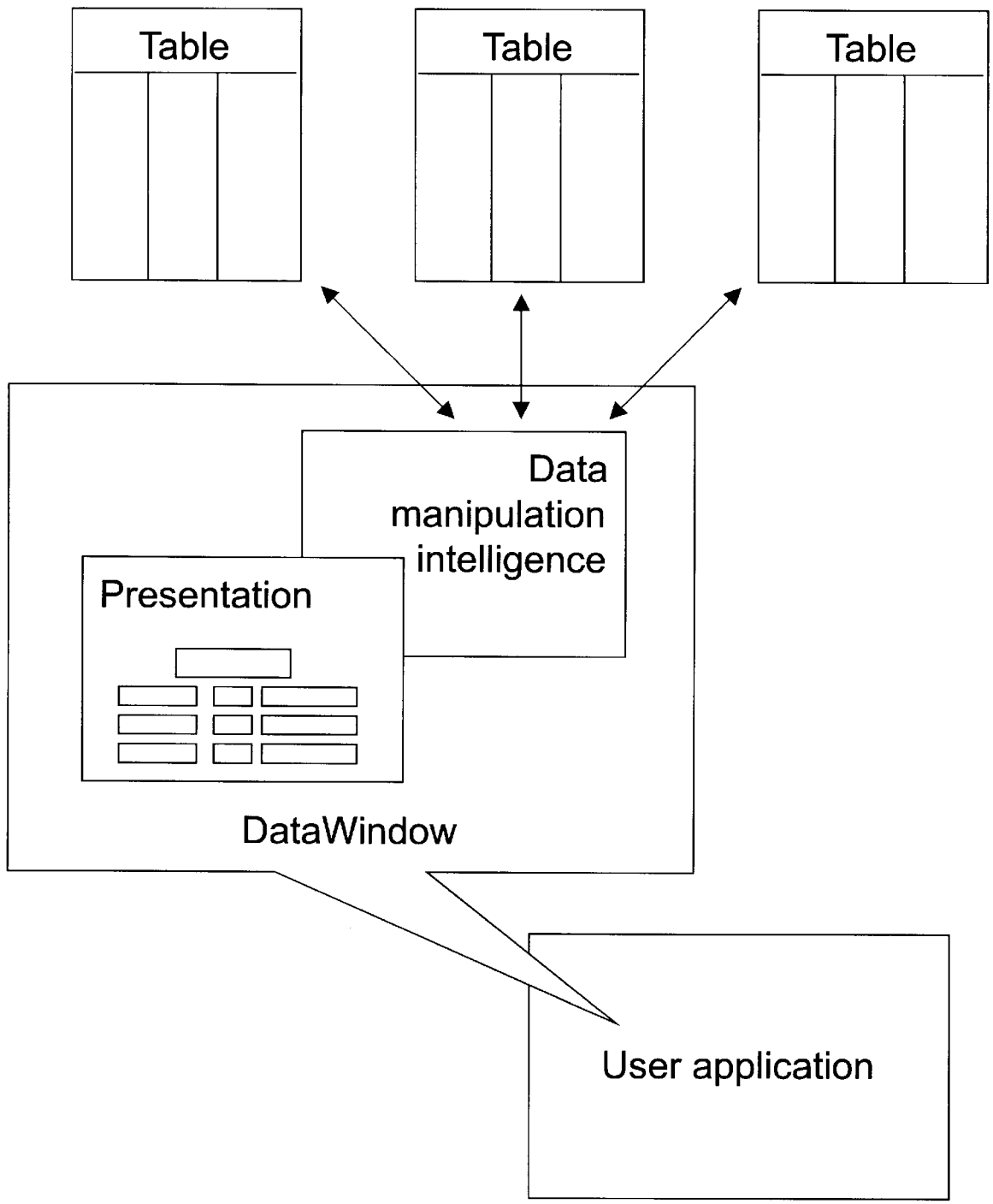
FIG. 6B is a block diagram illustrating use of a Power-Builder Data Windows component in one's application for manipulating and displaying database information.

In a user's application, typically numerous places exist where the application needs to create, retrieve, update, or delete rows in tables. Two basic techniques are provided: embedded SQL and PowerBuilder DataWindows. With the former, the user can embed SQL statements in his/her application to manipulate the rows. The development environment supports all of the usual features of this industry-standard language, along with DBMS-specific syntax and extensions of its own. As illustrated in FIG. 6A, a user employs embedded SQL in places where a user's design calls for row manipulation without the need for display. As illustrated in FIG. 6B, the user uses DataWindows in his/her application to manipulate the rows and display them to the end user. DataWindows are a special access feature of PowerBuilder that a user employs for most of the table processing his/her application design requires. DataWindows contain both the intelligence to do row manipulation (including creation, retrieval, updating, deletion) and the presentation (user-interface) abilities to let people see and work with those rows.

The requirements for the Order Entry application specify that it must process several different tables from the two databases in a variety of different ways. In most cases, the processing involves letting the end user display and/or interact with the table data (using DataWindows). In the remaining situations (where no display of the data is involved), the developers can embed SQL statements in the application to do the job.

4. Implementing the user interface: windows and controls

Figure 7A:
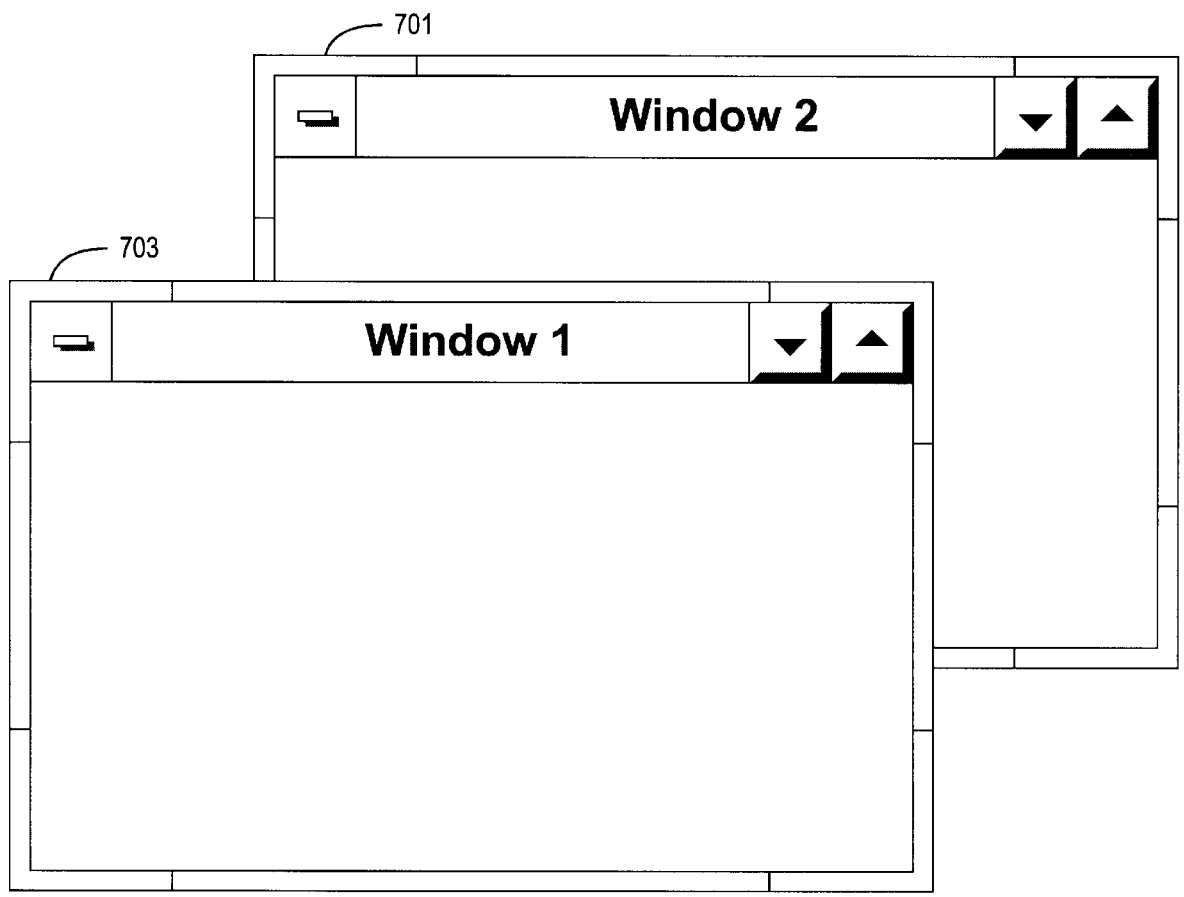
FIG. 7A is a diagram illustrating windows in a graphical user interface, which are employed as major building blocks to construct a user interface for an application developed in the system.

The user-interface requirements of a user's application enable people to interact in a number of ways with data that the application accesses. The user uses windows, such as windows 701 and 703 in FIG. 7A, as major building blocks to construct the user interface of an application in the development environment. Windows—rectangular frames that a user can usually move and resize on the screen—look and work just like the windows a user is already familiar with in his/her graphical operating. Windows provide features a user can use to let people view information, manipulate information, and initiate actions.

Figure 7B:
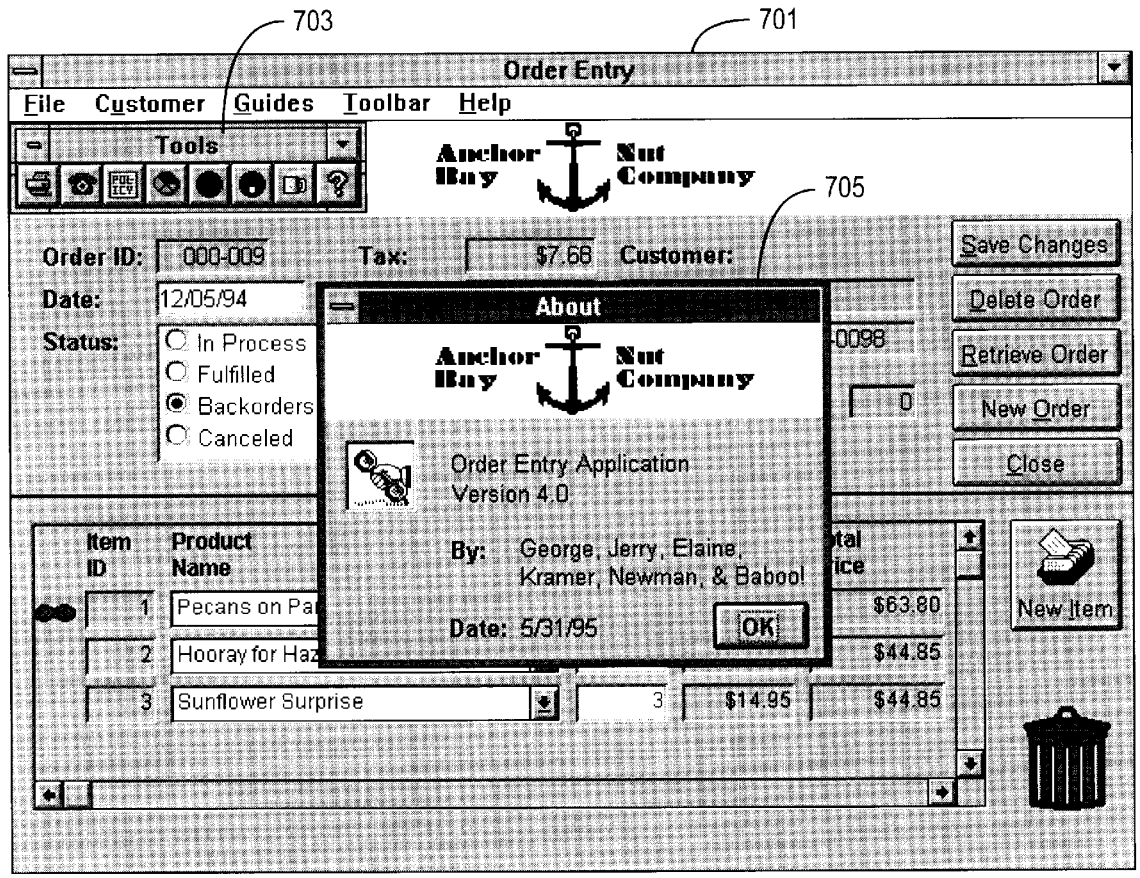
FIG. 7B is a bitmap screen shot illustrating different types of windows provided by the system for use in one's application.
Figure 7C:
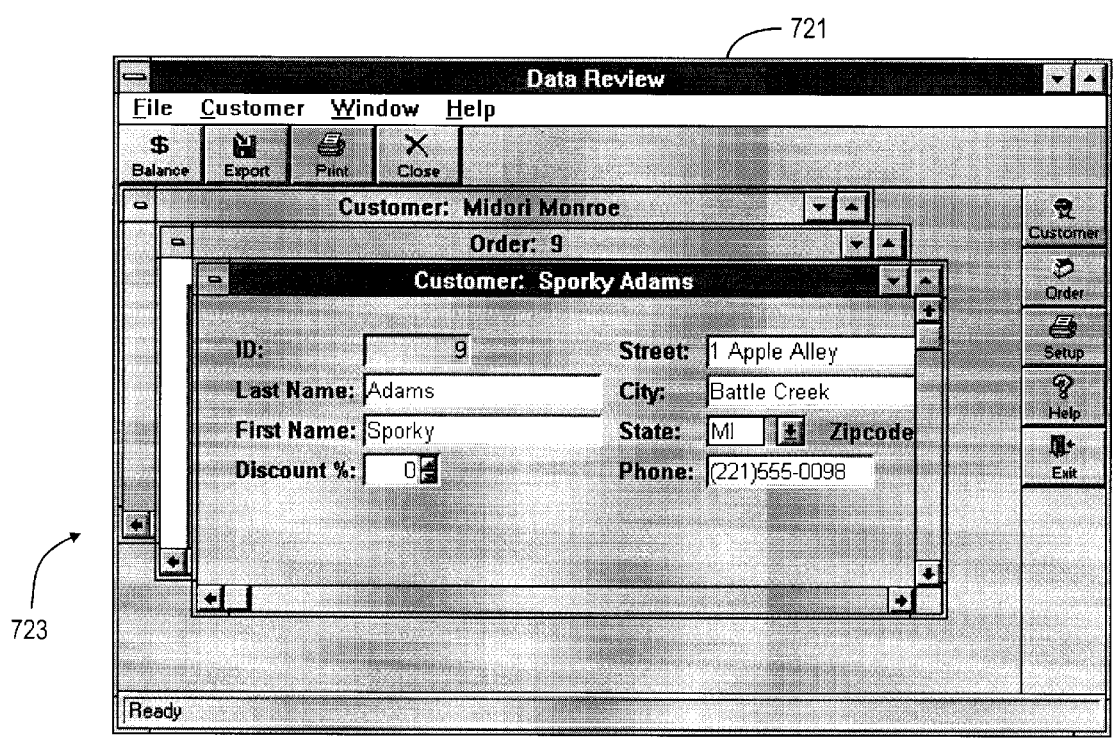
FIG. 7C is a block diagram illustrating use of an MDI (multi-document interface) style window, which can be employed in one's application.

A user can design the user interface of an application to involve just one window. More often, however, a user will involve several different windows, with each one playing a particular role to help the user get a larger job done. The role of any individual window is usually to present a particular kind of information and let users interact with that information in certain ways. As illustrated in FIG. 7B, several different types of windows are provided that a user can use in his/her application. Each type has some unique characteristics that make it good for fulfilling one or more specific presentation or interaction needs. Main windows (e.g., window 701) are where a user will usually have users perform the major activities of the application. Response windows and message boxes (e.g., window 705) are good for situations where one wants to force end users to consider some information and/or choose some action before they can do anything else in the application. Popup windows and child windows (e.g., window 703) are handy for displaying additional pieces of information, or providing additional services, that support the users' activities as they work in a particular main window. As illustrated in FIG. 7C, MDI (multi-document interface) frames (e.g., frame 721) are useful in many applications where end users need a convenient and organized way to work with multiple main windows. When placed inside one of these frames, main windows act as sheets (e.g., sheets 723) that users can easily shuffle around.

Figure 8A:
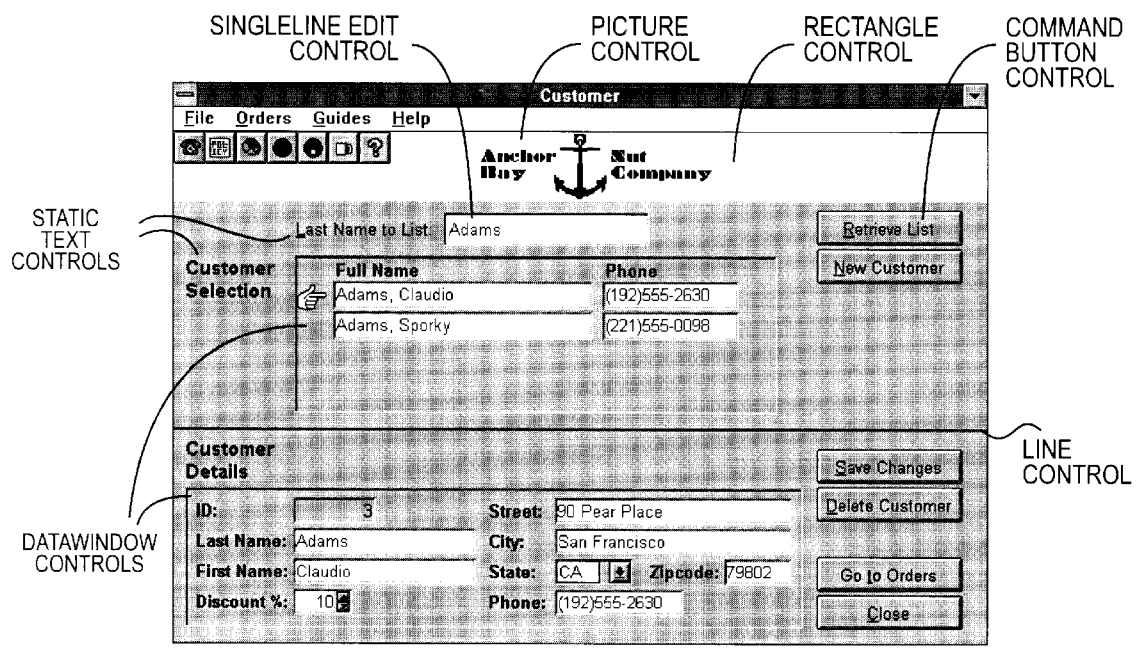
FIG. 8A is a bitmap screen shot illustrating different types of windows or "controls" which can be employed for creating a user interface of one's application.
Figure 8B:
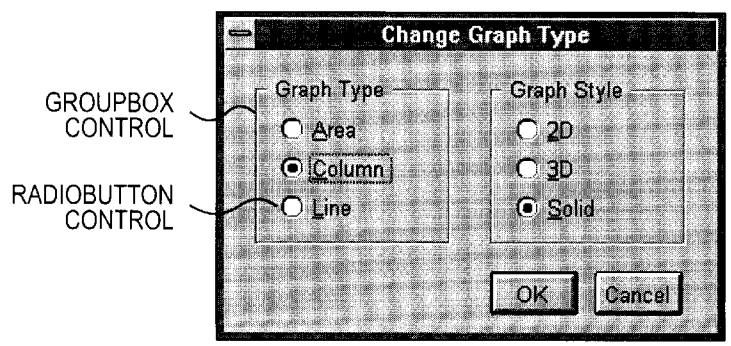
FIG. 8B is a bitmap screen shot illustrating group box and radio button controls.

As shown in FIGS. 8A–B, the development environment provides a wide range of controls a user can place in a window to hold the information end users need to see and to implement the interactions end users need to perform. Controls are provided for: (1) displaying and/or manipulating values (e.g., StaticText, SingleLineEdit, MultiLineEdit, and EditMask controls); (2) making choices (e.g., ListBox, DropDownListBox, CheckBox, and RadioButton controls); (3) showing information graphically (e.g., Graph, HScrollBar, VScrollBar controls); (4) dressing up a window (e.g., GroupBox, Line, Oval, Rectangle, RoundRectangle, and Picture controls); (5) presenting a user's DataWindows (i.e., a special kind of control that a user uses when he/she wants a window to display one of the DataWindows a user has designed for his/her application); and (6) initiating actions (e.g., CommandButton and PictureButton controls).

In addition to the preceding kinds of controls, a user can also use user-defined controls. A user can define his/her own controls based on one or more of the standard PowerBuilder controls and store them as application components called user objects. Then a user can include these custom-made controls in any windows a user wants. Additionally, a user can use third-party controls, such as VBX controls or controls in DLLs, by defining them as user objects. These external controls can be included in any windows desired.

Figure 9A:
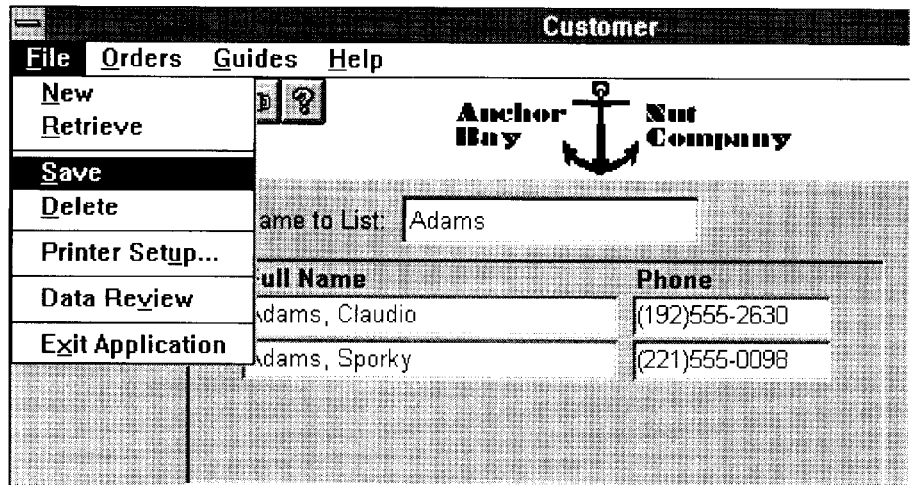
FIGS. 9A–C are bitmap screen shots illustrating user interface components for receiving user input, including a pull down menu, a tool bar, and a popup menu list.
Figure 9B:
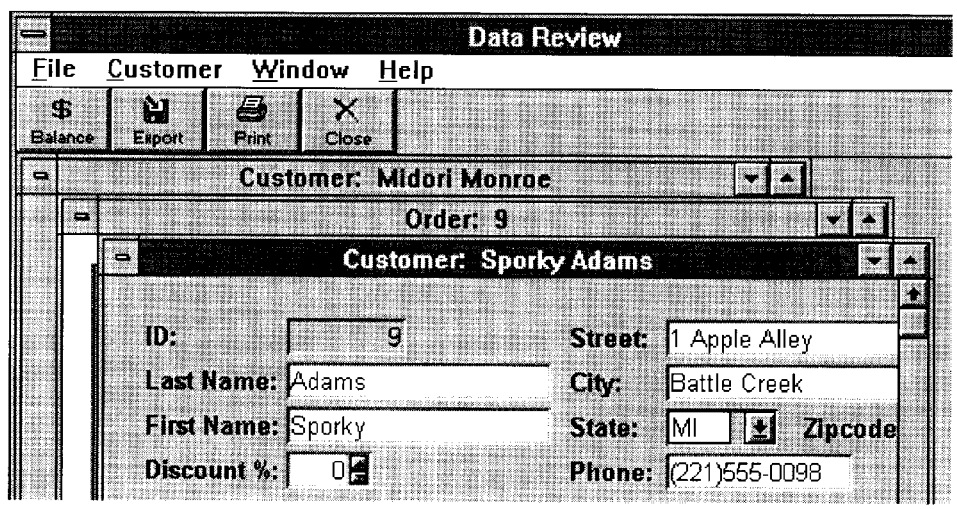
Figure 9C:
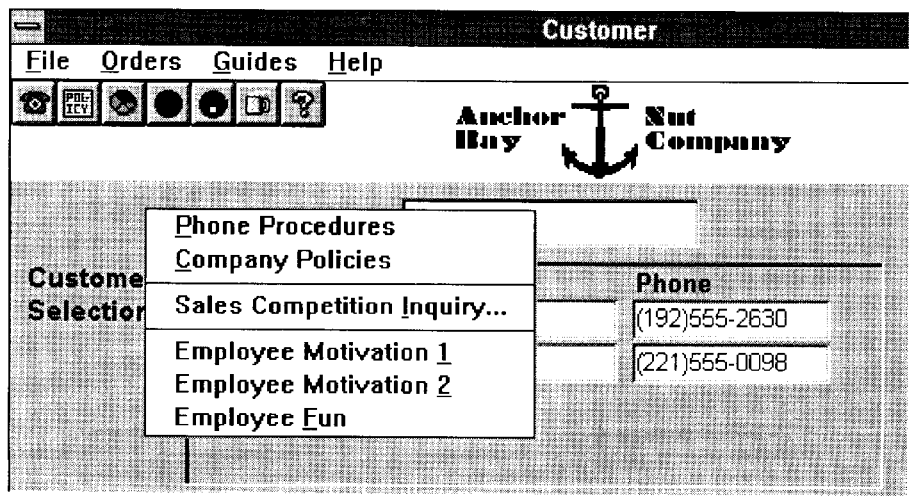

Another way to let the user initiate actions in a window is to use menus. A menu lists commands (menu items) that are currently available so that the user can select one. The development environment provides different methods for presenting menus in a window. In many of the windows a user designs, a user will want to display a menu of one or more items across the top in the menu bar, such as illustrated in FIG. 9A. This enables end users to move through those items and pull down submenus (dropdown menus) that a user has defined for each one. If the window is an MDI frame, a user can optionally define a toolbar, shown in FIG. 9B, to accompany the menu. The toolbar displays buttons corresponding to one or more menu items, giving the user an alternative way to select those items. Sometimes a user may want to let users initiate certain actions by popping up a menu within the window. A popup menu lists its items vertically, shown in FIG. 9C, enabling users to move up or down to select the item they want. Popup menus are handy for giving users quick access to a subset of the most common actions they perform in the window or to adjust those actions that apply to the current control.

5. Controlling the application's processing: events and scripts

After the user has sketched out the windows he/she needs, the user then specifies the flow of processing in his/her application, both within a window and from one window to another; and supply the specific processing logic that is to be performed for each activity of the application during the course of this flow. Applications created in the development environment are event-driven: an application waits to see what actions a user takes in a window to determine what processing to perform.

Figure 10A:
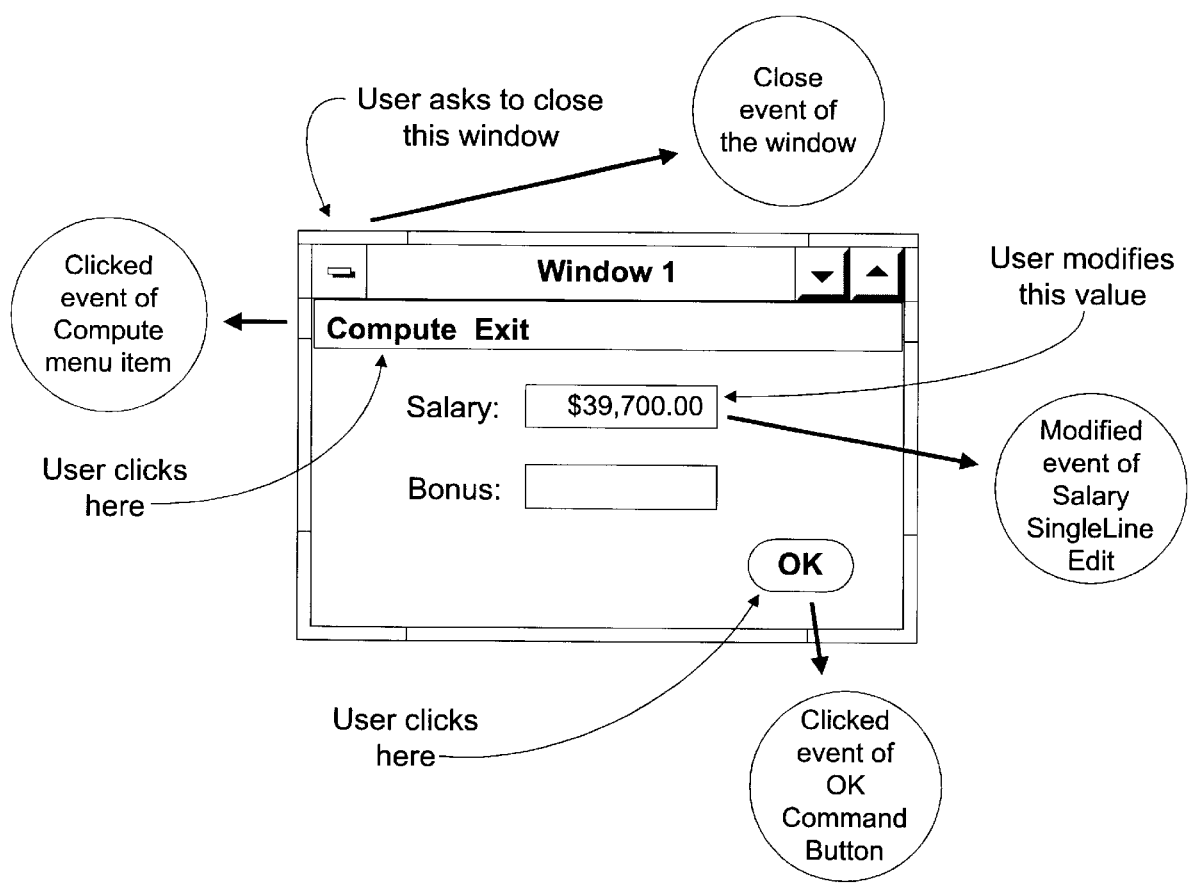
FIG. 10A is a block diagram illustrating different events which are triggered as a result of actions occurring at a user interface.

Whenever the user does something involving one of the application's user-interface components (such as a window, control, or menu item), that action triggers a particular event. As shown in FIG. 10A, for example, each of the following actions triggers a different event.

| Doing this | Triggers |
|---|---|
| Clicking on a particular CommandButton control in a window | The Clicked event of that CommandButton control |
| Clicking on a particular menu item in a window's menu | The Clicked event of that menu item |
| Modifying the value in a particular SingleLineEdit control of a window | The Modified event of that SingleLineEdit control |
| Closing a particular window | The Close event of that window |

Figure 10B:
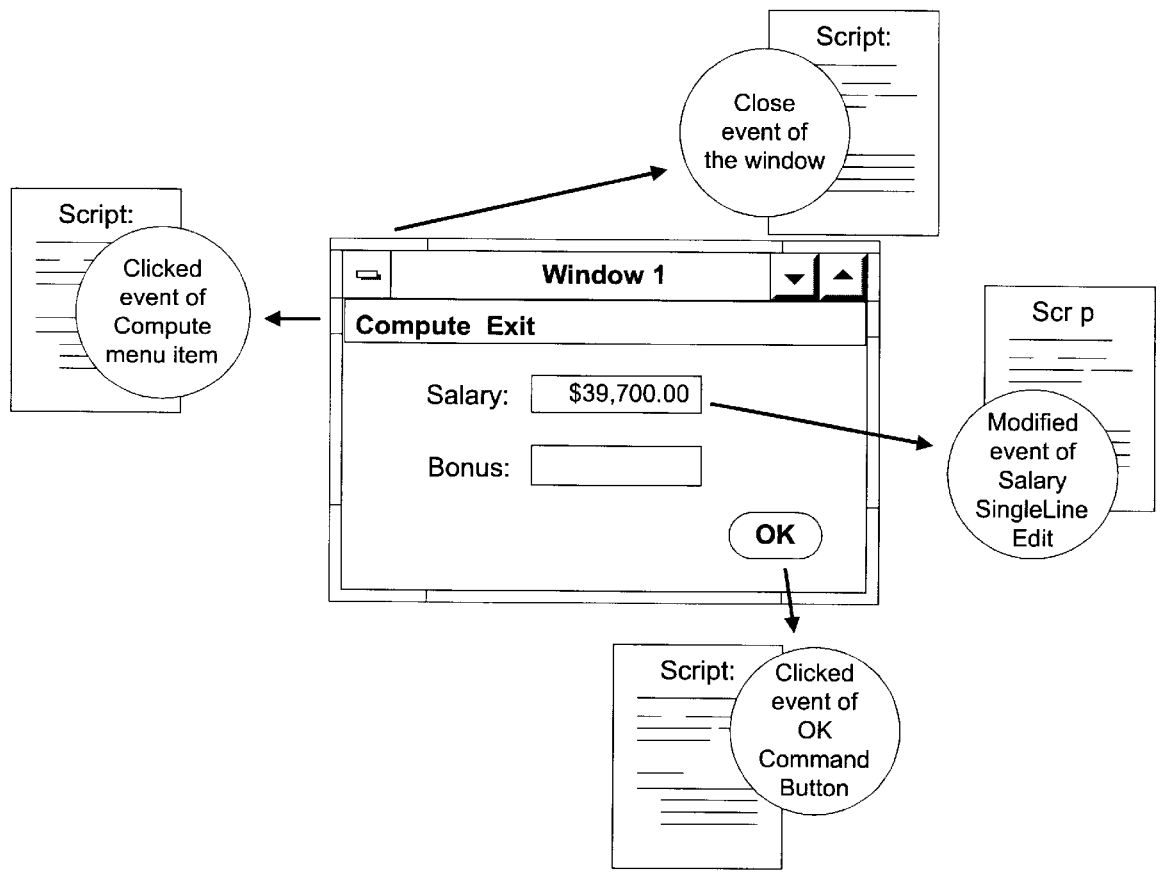
FIG. 10B is a block diagram illustrating execution of user-supplied script (instructions), which is triggered in response to occurrence of an event.

When an event is triggered, a user's application executes a corresponding script, which contains any processing logic a user has written for that event. This is illustrated in FIG. 10B. A user's job as a designer, therefore, is to figure out all of the events of interest that might occur in his/her application and to provide appropriate processing logic for each event (in its script).

Each kind of user-interface component has its own set of several different events that can happen to it, including, for instance, the following.

| This component | Has |
|---|---|
| A CommandButton control | About a dozen different events, including: Clicked, GetFocus, and LoseFocus |
| A menu item | Just a couple of events: Clicked and Selected |
| A SingleLineEdit control | About a dozen different events, including: Modified, GetFocus, and LoseFocus |
| A window | More than 25 different events, including: Open, Close, Resize, Timer, and Clicked |

Some events apply to a user's application as a whole, including (1) one that is triggered when the application starts (the Open event), and (2) one that's triggered when the application ends (the Close event). In many cases, a user need only write scripts for just one or two of the events of a particular component (and sometimes a user won't need any for that component).

Letting end users drive the flow of processing is appropriate most of the time, but on occasion a user will want the application to temporarily take control. In such situations, the user can write code in the script of one event that manually causes another event to occur. When doing this, a user can either trigger the event so that its script executes right away, or post the event to a queue so that its script execution is deferred (until after the scripts of any earlier events have executed). A user can also define his/her own events for any particular component and then manually trigger or post them to execute their scripts. These "user events" are useful for extending the processing of other event scripts by serving as subroutines; and responding to certain lower-level messages (from a user's operating environment) that the development environment does not provide as standard events.

Once a user knows which events he/she needs to handle in his/her application, a user provides an appropriate script for each one. As illustrated in FIG. 11A, a script is a body of procedural code that a user writes in the PowerScript™ language to express the processing logic to perform, typically in response to particular events. Most scripts are relatively short (tens of lines long, not hundreds), since they just need to express the processing for particular events and not for the whole application.

Figure 11B:

PowerScript is a high-level language that provides several different syntactic constructs a user can use to write the code he/she needs. As shown in FIGS. 11B–C, these include variable declarations, Powerscript statements, function calls (built-in and user-defined), embedded SQL statements, and comments. PowerScript supports many data types, as well as arrays and structures of variables. It also provides several levels of scoping that a user can choose from for each variable he/she declares. PowerScript statements provide flow-of-control mechanisms (such as branching and looping) that a user can use to steer the processing in a particular script. When a user creates a user-defined function, he/she specifies the arguments required (if any), a script of the code that is to execute, and the value it is to return (if any). A user can then call that user-defined function from event scripts or from other user-defined functions.

6. Mapping the requirements of the application

In the example of the hypothetical company, Anchor Bay Nut Company, the user would map processing requirements to development environment features as follows. The Order Entry application needs to handle a number of different events for its various windows, controls, and menus. For instance, consider the application's Customer window. To provide all of the processing for the window of FIG. 8A, for instance, scripts are required for each of the following events.

| Type of component | Name | Events that need scripts |
| --- | --- | --- |
| Window | w_customer | Open, RButtonDown |
| CommandButton control | cb_close | Clicked |
|  | cb_delete | Clicked |
|  | cb_new | Clicked |
|  | cb_orders | Clicked |
|  | cb_retrieve | Clicked |
|  | cb_save | Clicked |
| DataWindow control | dw_detail | Clicked, RowFocusChanged, Uevent_keypressed (a user event) |
|  | dw_list | EditChanged, ItemChanged, ItemError |
| SingleLineEdit control | sle_lname | Modified |
| Menu item listed under File | m_new | Clicked |
|  | m_retrieve | Clicked |
|  | m_save | Clicked |
|  | m_delete | Clicked |
|  | m_printersetup | Clicked |
|  | m_reviewdata | Clicked |
|  | m_exit | Clicked |
| Menu item listed under Orders | m_goto | Clicked |
| Menu item listed under Guides | m_phoneprocedures | Clicked |
|  | m_companypolicies | Clicked |
|  | m_salescompetitioninquiry | Clicked |
|  | m_employeemotivationa | Clicked |
|  | m_employeemotivationb | Clicked |
|  | m_employeefun | Clicked |
| Menu item listed under Help | m_contents | Clicked |
|  | m_about | Clicked |

The Order Entry application may include user-defined functions to provide additional processing services that can be called from the event scripts. For example, the application's Customer window can includes the three following user-defined functions.

| User-defined function | Purpose |
| --- | --- |
| wf_delcustorders | To be called whenever the user asks to delete a customer to make sure the customer does not have any outstanding orders in the database |
| wf_newcustnum | To be called whenever the user asks to add a customer to compute the next available ID number for a new customer in the database |
| wf_warndataloss | To be called at the beginning of various operations to check whether any unsaved data might be lost and to warn the user |

The wf_delcustorders function may be constructed, for examle, as shown in FIG. 11D.

With an understanding of how an application is designed in the system of the present invention, the methods of the present invention for "piping" data between data sources can now be understood.

Improved "Pipeline" Transfer Of Data Between Data Sources

The following description will focus on specific modifications to a client/server database, such as System 240, for providing improved data transfer between data sources.

A. Overview

Of particular interest to the present invention is the requirement that applications be able to migrate data from one place to another in the course of their work. For example, a user might need to create a new sales summary table in a user's database by joining various regional sales tables and extracting particular data from them, or copy a payroll table from the server database to a local database so that the application can access it without needing the network.

Figure 12A:
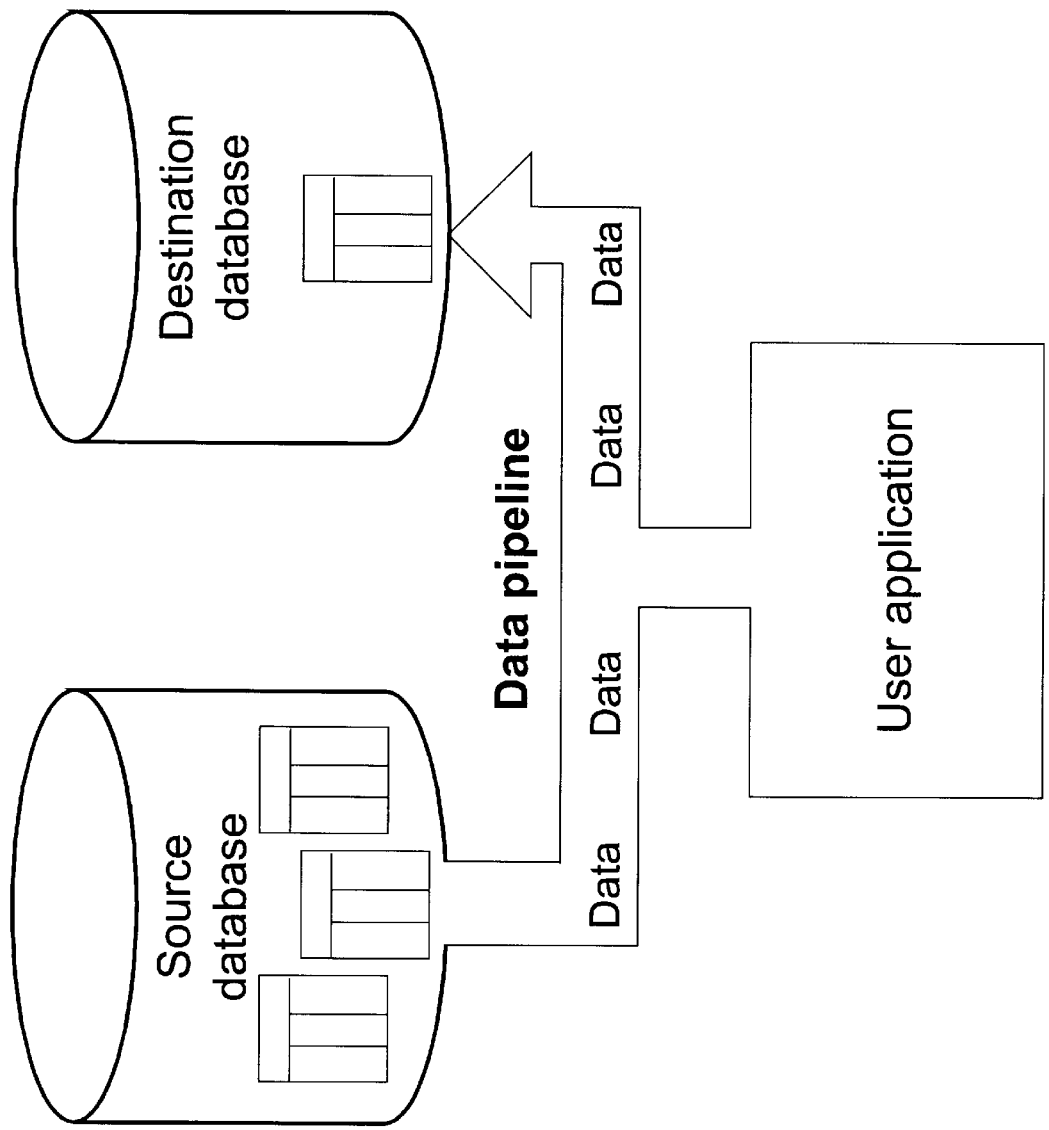
FIG. 12A is a block diagram illustrating a "data pipeline" of the present invention for "pumping" data from one or more source tables to a new or existing destination table.

To handle these requirements, the developement environment provides "Data Pipelines," such as illustrated in FIG. 12A. A data pipeline is an application component a user can design to "pump" data—including Blob (binary large object) data—from one or more source tables to a new or existing destination table. The source and destination tables a user specifies can either be in the same database or in separate databases (even if they are different kinds of databases that involve different DBMSs). Using the system of the present invention, therefore, the designing user creates a "pipeline object"—a tool for moving data from one database to another, even across different database management systems. The object may be employed for a number of uses. One use, for instance, is migrating data from a local database (e.g., Watcom SQL) to a database server (e.g., Sybase SQL Server).

Figure 12B:
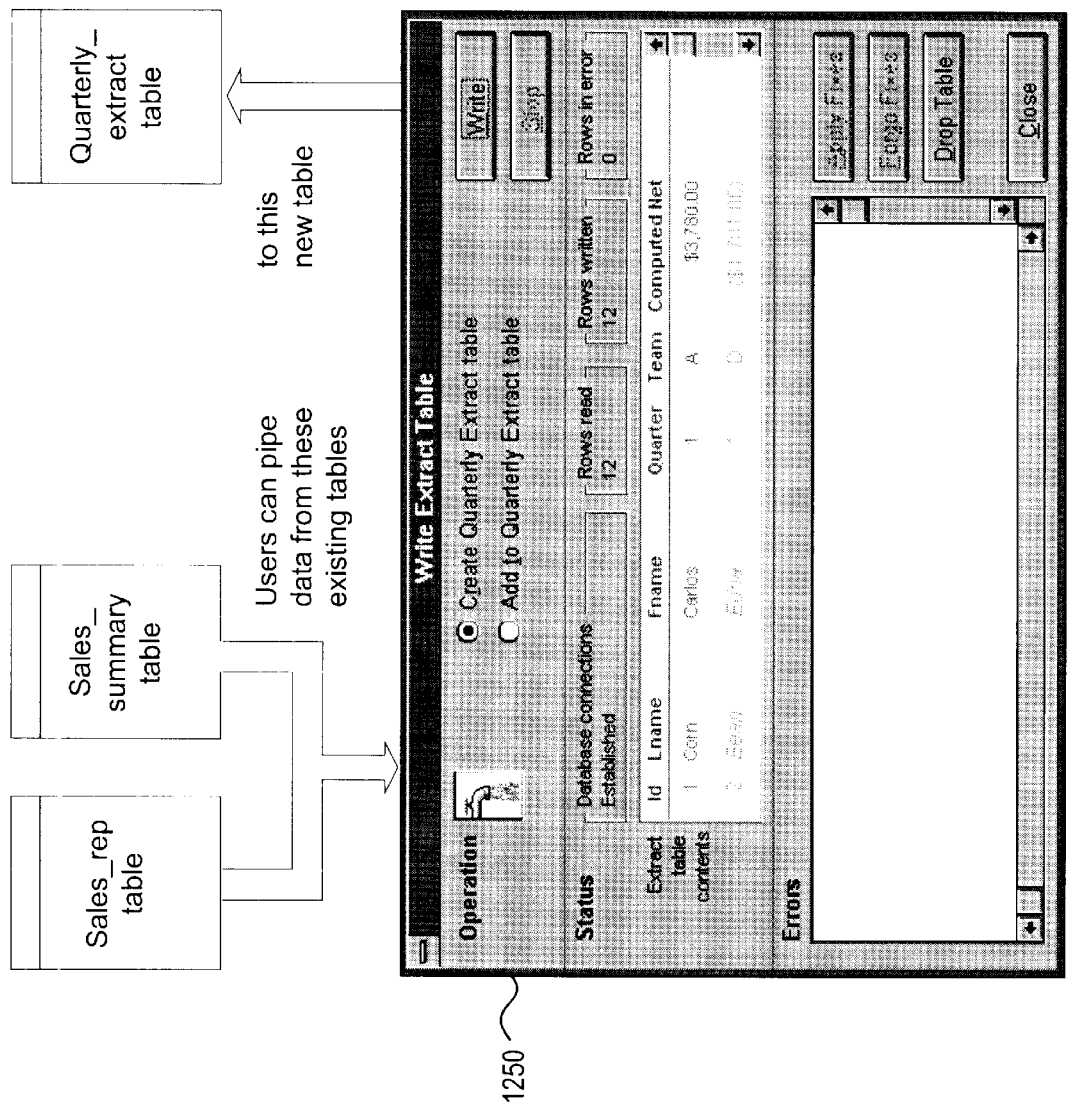
FIG. 12B is a diagram illustrating use of a data pipeline for extracting quarterly information from a sales database table and storing that data in a new table.

Suppose, for instance, that users of the Order Entry application want to extract quarterly data from the Sales_rep and Sales_summary tables of the company's sales database (ABNCSALE.DB) and store that data in a new table (which they can use later for querying and reporting). As illustrated in FIG. 12B, the application provides this capability to users by displaying a window 1250, "w_sales_extract," that lets users execute an appropriate data pipeline.

A data pipeline, constructed in accordance with the present invention, makes it possible to copy rows from one or more source tables to a new or existing destination table-either within a database, or across databases, or even across DBMSs. A user can take advantage of data pipelines in different ways: as a utility service for developers, or to implement data migration capabilities in an application. Regarding the former, a user may occasionally want to migrate data for logistical reasons (such as to create a small test table from a large production table), while working in the PowerBuilder development environment. In this case, a user can use the Data Pipeline painter interactively to do that migration right then and there. Regarding the latter, if a user is building an application whose requirements call for migrating data between tables, the user can design an appropriate data pipeline in the Data Pipeline painter, save it, and then enable users to execute it from within the application. This technique can be useful in many different situations, such as when a user wants the application to download local copies of tables from a database server to a remote user, or when the user wants it to roll up data from individual transaction tables to a master transaction table.

Use of a data pipeline in one's application entails five basic steps. These steps include: (1) Building the objects needed; (2) Performing some initial housekeeping; (3) Starting the pipeline; (4) Handling row errors; and (5) Performing some final housekeeping. These steps will now be described.

B. Building a pipeline object

To implement data piping in an application, a user will need to build a few different objects: a pipeline object; a supporting user object; and a window. A user must build a pipeline object to specify the data definition and access aspects of the pipeline that a user wants his/her application to execute.

The development environment provides a Data Pipeline painter in to create this object and define the characteristics a user wants it to have. The characteristics a user can define in the Data Pipeline painter include the following.

(1) The source tables to access and the data to retrieve from them;
(2) The destination table to which a user wants that data piped;
(3) The piping operation to perform (create, replace, refresh, append, or update);
(4) The frequency of commits during the piping operation (either after every n rows are piped or only after all rows are piped);
(5) The number of errors to allow before the piping operation is terminated; and
(6) Whether to pipe extended attributes to the destination database (from the PowerBuilder repository in the source database).

Figure 13A:
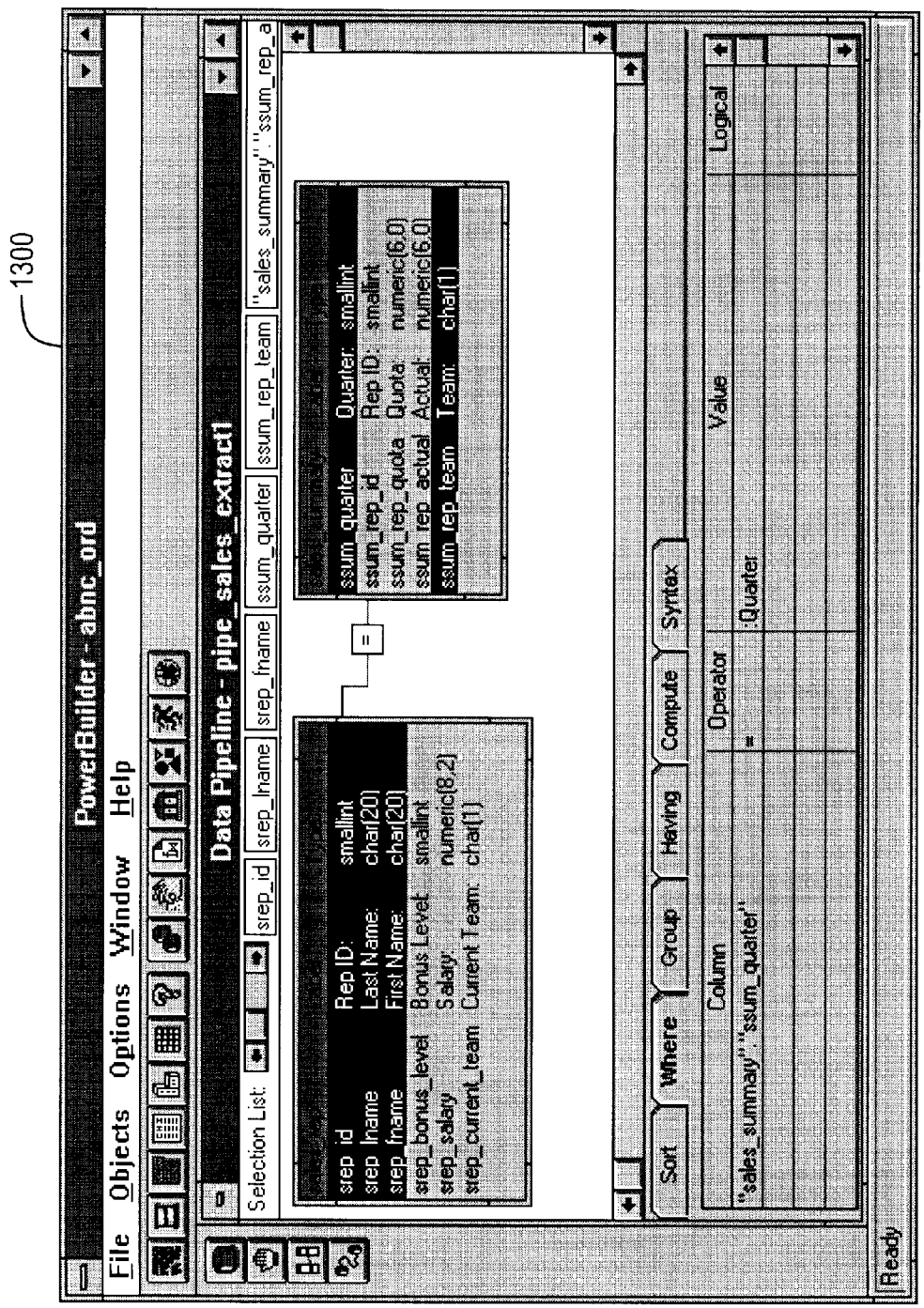
FIG. 13A is block diagram illustrating a data pipeline painter (graphical editor) provided by the system for defining a pipeline object.
Figure 13B:
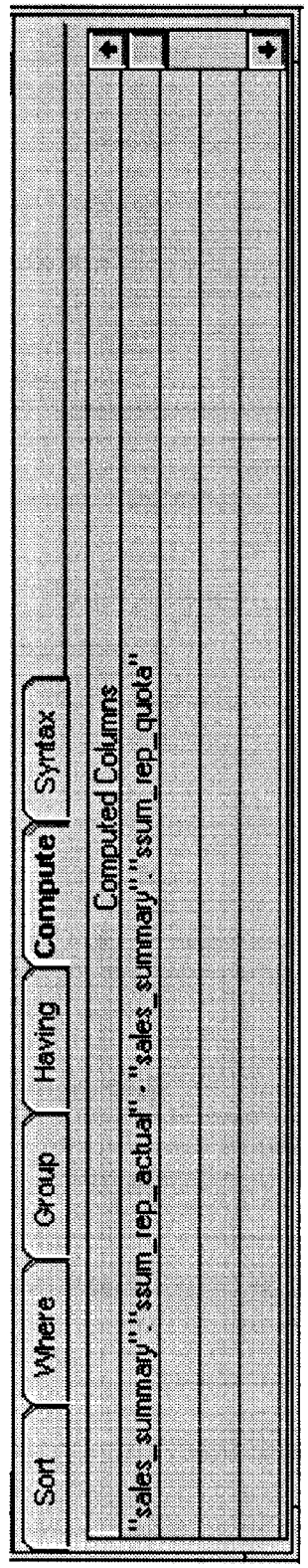
FIG. 13B is a bitmap screen shot illustrating use of a pipeline object to define a computed column to be calculated and piped.

FIG. 13A illustrates use of Data Pipeline painter 1300 for defining a pipeline object named pipe_sales_extract1 (one of two pipeline objects employed by the w_sales_extract window in the sample Order Entry application). As shown, the pipeline object joins two tables (Sales_rep and Sales_summary) from the company's sales database to provide the source data to be piped. It retrieves just the rows from a particular quarter of the year (which the application must specify by supplying a value for the retrieval argument named quarter). The pipeline object also indicates specific columns to be piped from each source table (srep_id, srep_lname, and srep_fname from the Sales_rep table, as well as ssum_quarter and ssum_rep_team from the Sales_summary table). In addition, the pipeline object defines a computed column to be calculated and piped. This computed column subtracts the ssum_rep_quota column of the Sales_summary table from the ssum_rep_actual column, as shown in FIG. 13B.

Figure 13C:
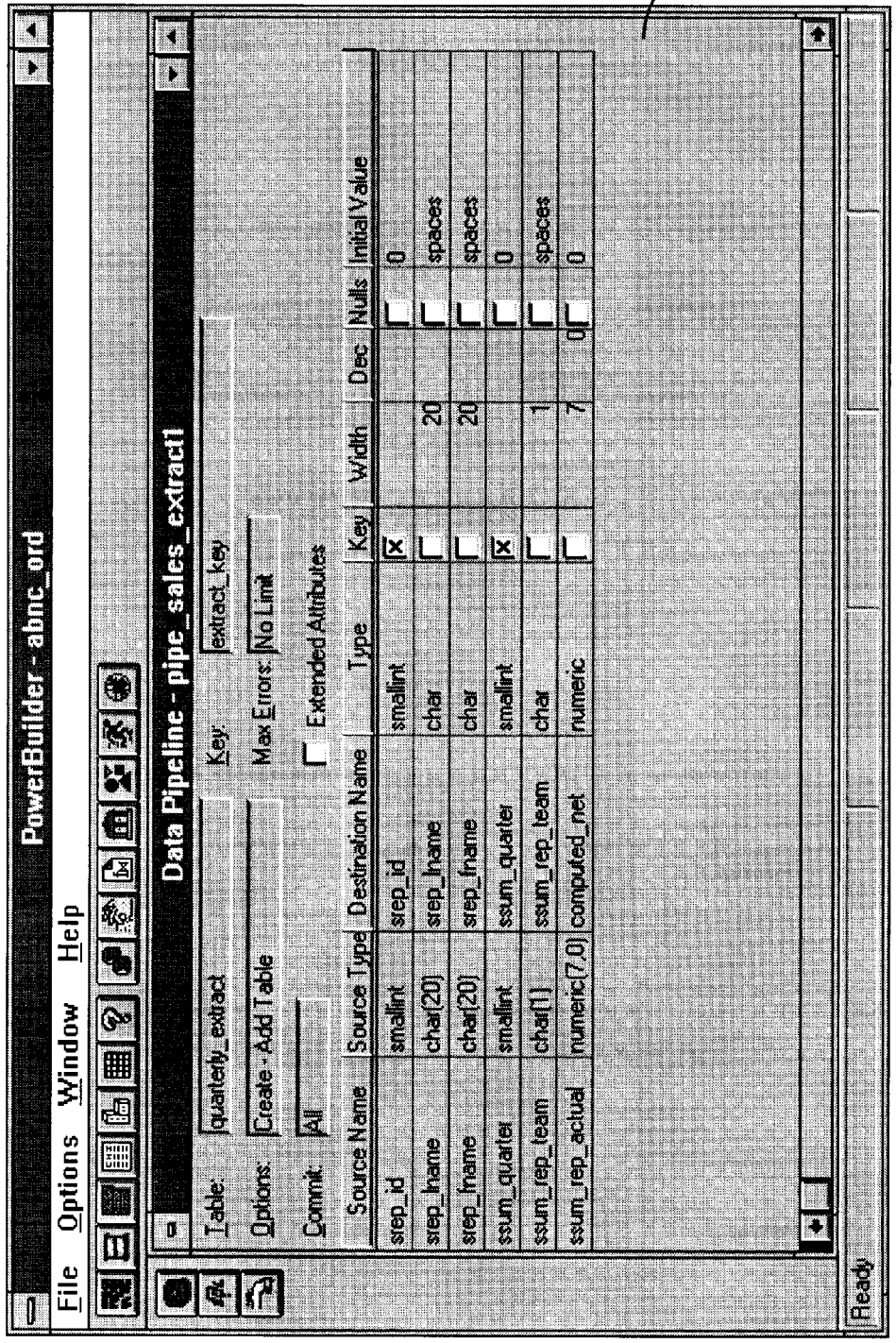
FIG. 13C is a bitmap screen shot illustrating a graphical representation of a data pipeline, for indicating how data is to be piped from a source table (or tables).

The details of how pipe_sales_extract1 is to pipe its source data are specified in Data Pipeline 1360, shown in FIG. 13C. Notice that this pipeline object is defined to create a new destination table named Quarterly_extract. As illustrated below, the application specifies the destination database in which to put this table (as well as how it specifies the source database in which to look for the source tables).

The pipeline object also specifies the following. A "commit" (i.e., database transaction commit) will be performed only after all appropriate rows have been piped; if the pipeline's execution is terminated early, all changes to the Quarterly_extract table will be rolled back. No error limit is to be imposed by the application, so any number of rows can be in error without causing the pipeline's execution to terminate early. No extended attributes are to be piped to the destination database. The primary key of the Quarterly_extract table is to consist of the srep_id column and the ssum_quarter column. The computed column that the application is to create in the Quarterly_extract table is to be named computed_net.

C. Building a supporting user object

The foregoing illustrates how a pipeline object defines the details of the data and access for the pipeline. The pipeline object itself does not include the logistical supports—attributes, events, and functions—that an application requires to handle pipeline execution and control. To provide these logistical supports, an appropriate user object is constructed which inherits from the PowerBuilder pipeline system object—a core system object. This system object contains various attributes, events, and functions that enable a user's application to manage a pipeline object at execution time, including, for instance, the following.

| Attributes | Events | Functions |
|---|---|---|
| DataObject | PipeStart | Start |
| RowsRead | PipeMeter | Repair |
| RowsWritten | PipeEnd | Cancel |
| RowsInError | | |
| Syntax | | |

Figure 14A:
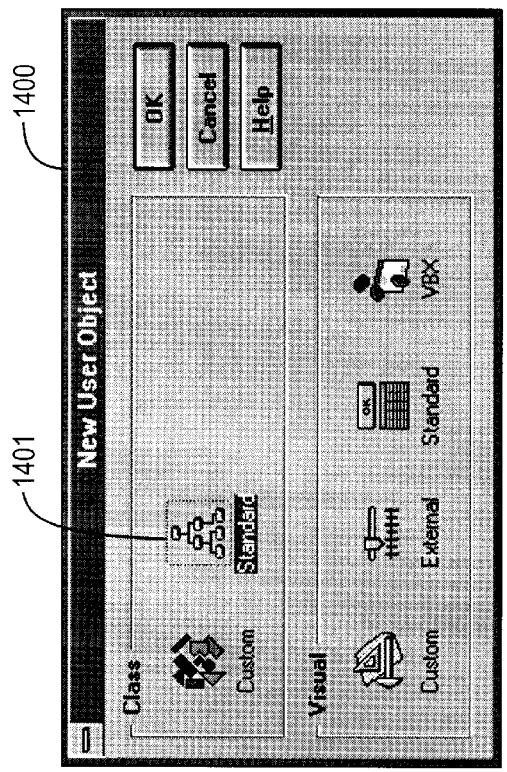
FIGS. 14A–B are bitmap screen shots illustrating a user interface for creating a "user object," which supports a data pipeline.
Figure 14B:
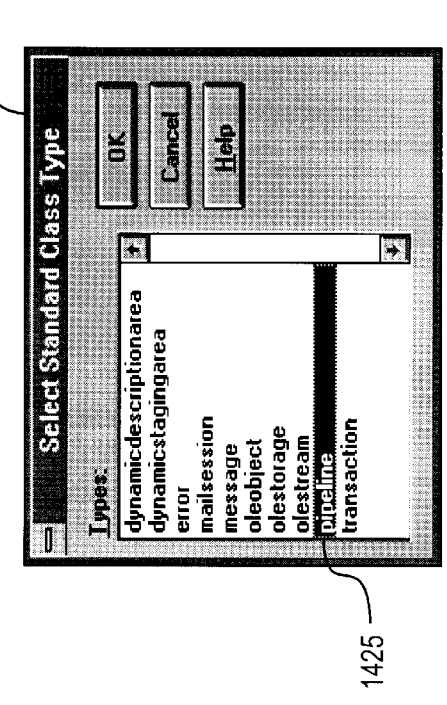

The supporting user object for a pipeline is built using the User Object painter, provided by the system. From a "Select User Object" dialog box, the user clicks a "New" button. In response, the system displays "New User Object" dialog box 1400, as shown in FIG. 14A. This prompts the user to specify which kind of user object the user wants to create. The user selects the Standard Class icon 1401, for selecting this type of user object. A "Select Standard Class Type" dialog box 1420 displays, as shown in FIG. 14B, prompting the user to specify the name of the PowerBuilder system object (class) from which a user wants to inherit his/her new user object. Here, the user selects "pipeline" 1425 and clicks OK.

Figure 14C:
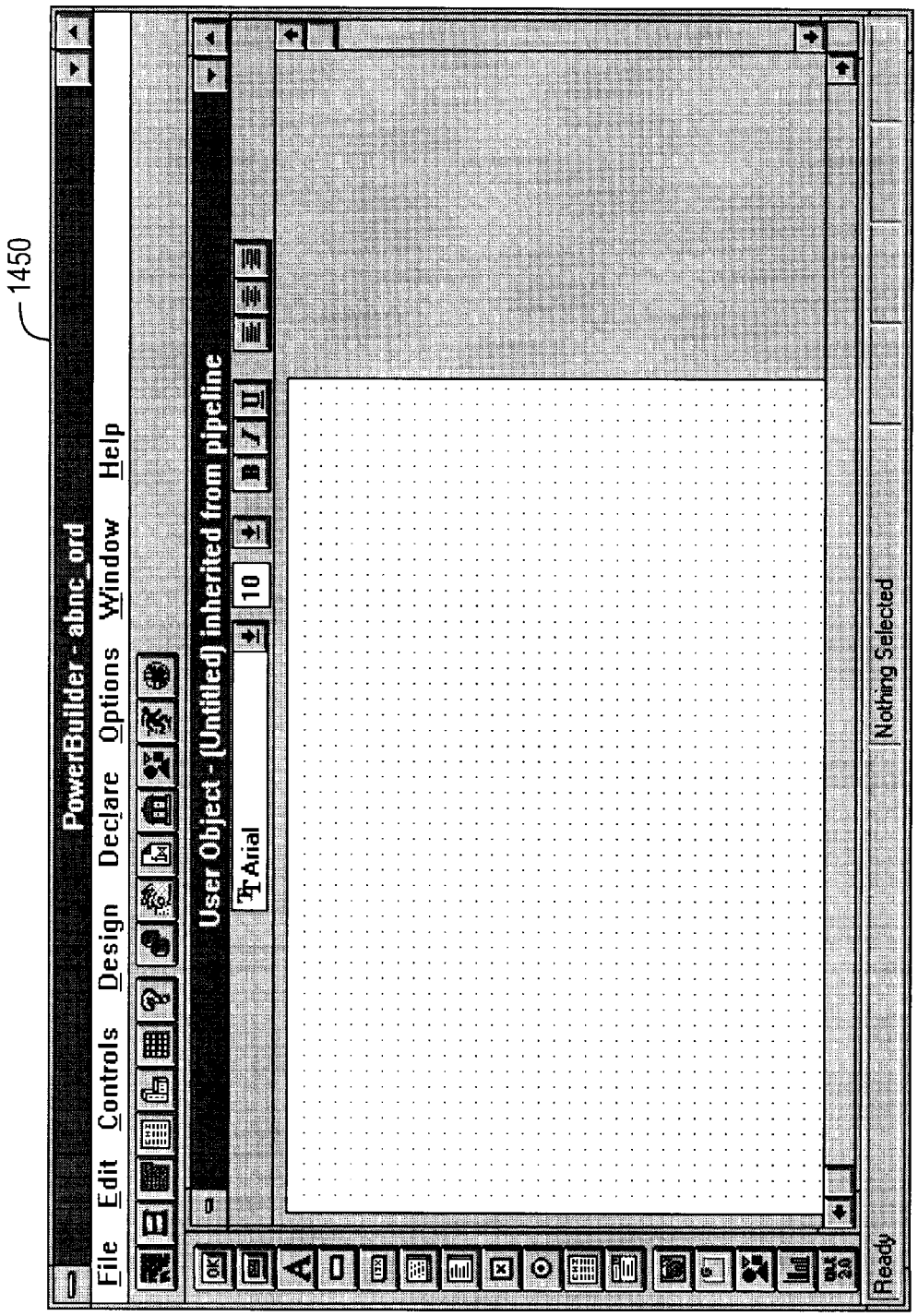
FIG. 14C is a bitmap screen shot illustrating a user object painter provided by the system for graphically creating a user object.

Now, the system displays a "User Object" painter workspace 1450, as shown in FIG. 14C. This painter enables the user to work with his/her new user object, or make any changes the user wants to the user object. This might involve coding events, functions, or variables for use in a user's application. When all changes are complete, the user saves the user object.

D. Building a window (user interface)

The next object required is a window object to provide a user interface to the pipeline, enabling people to interact with it in one or more ways. This interface supports user tasks of starting the pipeline's execution, displaying and repairing any errors that occur, and canceling the pipeline's execution if necessary. The pipeline provides at execution time its own DataWindow object, for displaying error rows (i.e., rows it cannot pipe to the destination table for some reason).

A user can otherwise design the window as he/she likes. The user will typically want to include various other controls, such as CommandButton or PictureButton controls to let the user initiate actions (such as starting, repairing, or canceling the pipeline); StaticText controls to display pipeline status information; and Additional Data Window controls to display the contents of the source and/or destination tables.

Several of the controls in the w_sales_extract window 1250 in FIG. 12B, for the Order Entry application, are used to implement particular pipeline-related capabilities. Exemplary functionality provided by controls of that window include the following.

| Control type | Control name | Purpose |
|---|---|---|
| RadioButton | rb_create | Selects pipe_sales_extract1 as the pipeline object to execute. |
| | rb_insert | Selects pipe_sales_extract2 as the pipeline object to execute. |
| CommandButton | cb_write | Starts execution of the selected pipeline. |
| | cb_stop | Cancels pipeline execution or applying of row repairs. |
| | cb_applyfixes | Applies row repairs made by the user (in the dw_pipe_errors DataWindow control) to the destination table. |
| | cb_forgofixes | Cleans all error rows from the dw_pipe_errors DataWindow control (for use when the user decides not to make repairs). |
| DataWindow | dw_review_extract | Displays the current contents of the destination table (Quarterly_extract). |
| | dw_pipe_errors | (Required) Used by the pipeline itself to automatically display the PowerBuilder pipeline-error DataWindow (which lists rows that can't be piped due to some error). |
| StaticText | st_status_read | Displays the count of rows that the pipeline reads from the source tables. |
| | st_status_written | Displays the count of rows that the pipeline writes to the destination table or places in dw_pipe_errors. |
| | st_status_error | Displays the count of rows that the pipeline places in dw_pipe_errors (because they are in error). |

E. Initial housekeeping

Now that a user has the basic objects needed, he or she is ready to start writing code to make the pipeline work in the application. At the outset, the user addresses some setup chores that will prepare the application to handle pipeline execution. This task involves connecting to the source and destination databases for the pipeline. To do this, the user writes the usual connection code in an appropriate script. One transaction object is used when connecting to the source database and a different transaction object is used when connecting to the destination database (even if it is the same database). Next, an instance of a user's supporting user object is created, so that the application can use its attributes, events, and functions. To do this, a variable is declared whose type is that user object. Then, in an appropriate script, a CREATE statement is employed to create an instance of the user object and assign it to that variable. Then, the user specifies the particular pipeline object to use. This is done through an assignment statement in an appropriate script, for assigning a string containing the name of the desired pipeline object to the DataObject attribute of a user's user-object instance.

For the Anchor Bay Nut Company example, the pipeline setup is provided in the Order Entry application as follows.

1. Connecting to the source and destination database

In this case, the company's sales database (ABNCSALE.DB) is used as both the source and the destination database. To establish the necessary connections to the sales database, a user event named uevent_pipe_setup (which is posted from the Open event of the w_sales_extract window) is created. The connection is established as follows.

```
// Create a new instance of the transaction object
// and store it in itrans_source (a variable
// declared earlier of type transaction)
itrans_source = CREATE transaction
// Next, assign values to the attributes of the
// itrans_source transaction object.
    .
    .
    .
// Now connect to the source database.
CONNECT USING itrans_source;
To establish their destination database connection, they coded:
// Create a new instance of the transaction object
// and store it in itrans_destination (a variable
// declared earlier of type transaction).
itrans_destination = CREATE transaction
// Next, assign values to the attributes of the
// itrans_destination transaction object.
// Now connect to the destination database.
CONNECT USING itrans_destination;
```

2. Creating an instance of the user object

To use the supporting user object (u_sales_pipe_logistics) in the application, a variable of its type is declared.

```
// This is an instance variable for the
// w_sales_extract window.
u_sales_pipe_logistics iuo_pipe_logistics
```

The uevent_pipe_setup user event includes logic to create an instance of u_sales_pipe logistics and store this instance in the variable iuo_pipe_logistics, as follows.

```
iuo_pipe_logistics=CREATE u_sales_pipe_logistics
```

3. Specifying the pipeline object to use

The application uses one of two different pipeline objects, depending on the kind of piping operation the user wants to perform: pipe_sales_extract1 creates a new Quarterly_extract table; and pipe_sales_extract2 inserts rows into the Quarterly_extract table. Both assume that the table does not currently exist. To choose a pipeline object and prepare to use it, the following logic is added in the Clicked event of the cb_write CommandButton (which users click when they want to start piping).

```
// Look at which radio button is checked in the
// w_sales_extract window. Then assign the matching
// pipeline object to iuo_pipe_logistics.
IF rb_create.checked = true THEN
    iuo_pipe_logistics.dataobject = &
                    "pipe_sales_extract1"
ELSE
    iuo_pipe_logistics.dataobject = &
                    "pipe_sales extract2"
END IF
```

This code appears at the beginning of the script, before the code that starts the chosen pipeline.

F. Starting the pipeline

With the setup chores taken care of, the pipeline is ready to execute. The following steps are undertaken. A Start function is placed in an appropriate script. In this function, a user will specify the transaction object for the source database; the transaction object for the destination database; the DataWindow control in which a user wants the Start function to display any error rows; and Values for retrieval arguments a user has defined in the pipeline object. If a user omits these values, the Start function will prompt the user for them automatically at execution time.

The pipeline retrieves rows from the source after executing the SQL SELECT statement (or, alternatively, a stored procedure). If the pipeline is either Creating, Replacing, or Refreshing a table at the destination, it performs the following before transfering any data.

| OPTION | Action (at destination) |
|---|---|
| CREATE | Executes a CREATE TABLE statement<br>Executes a CREATE INDEX statement (if index specified) |
| REPLACE | Executes DROP TABLE statement, then same as CREATE option |
| REFRESH | Executes a DELETE FROM <target table> statement |

The data is transferred to the destination by executing SQL INSERTS and/or SQL UPDATE statements which are constructed by the pipeline engine. The data transfer continues until either all rows have been copied from the source to the destination, the maximum allowable error limit has been exceeded or the application cancels the pipeline.

For the Anchor Bay Nut Company example, the pipeline is started as follows.

1. Calling the Start function

Figures 15A, 15B:
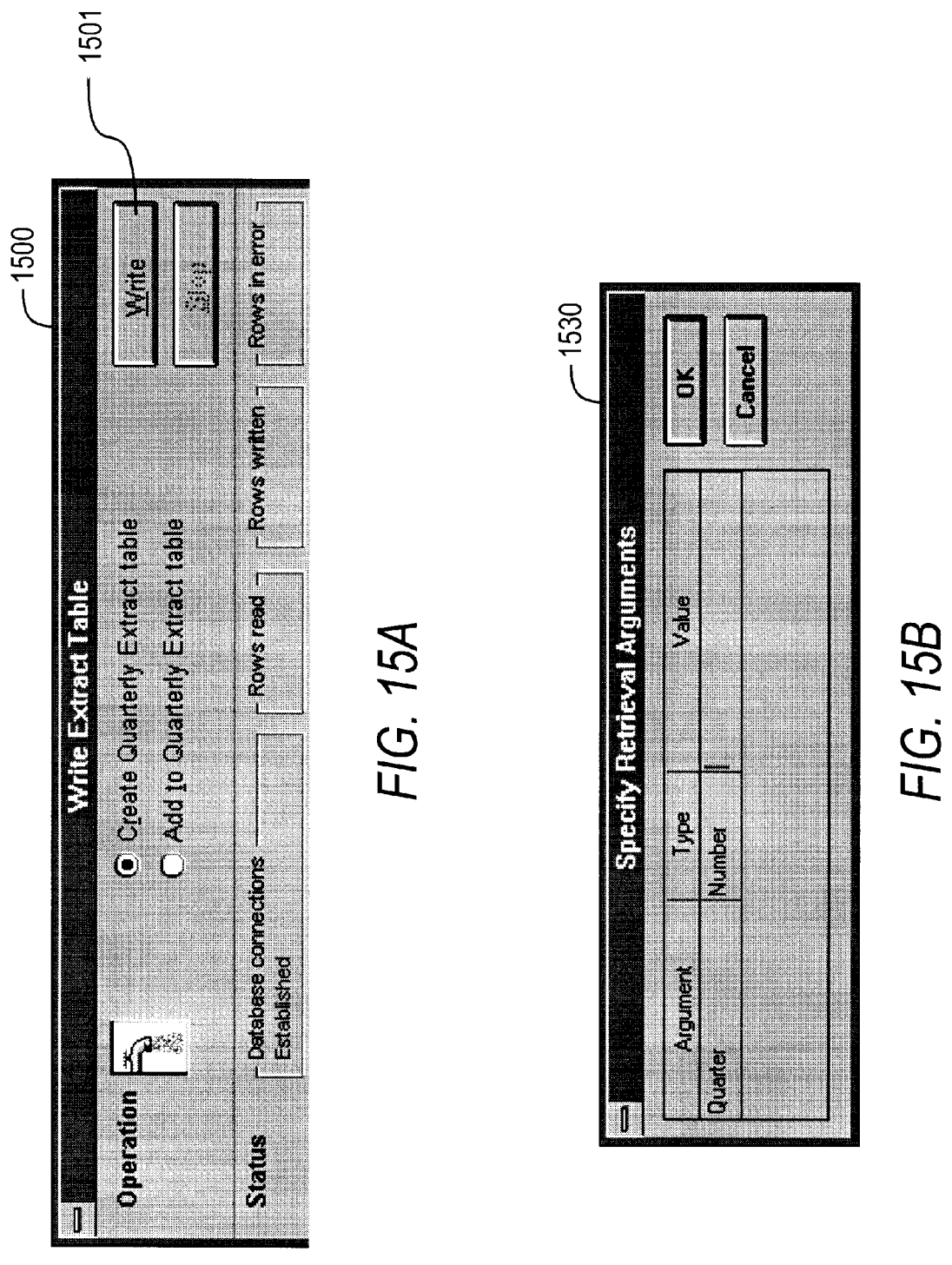

When users want to start their selected pipeline, they click cb_write CommandButton 1501 in the w_sales_extract window 1500, as shown in FIG. 15A. This executes the Clicked event of cb_write, which contains the Start function.

```
// Now start piping.
integer li_start_result
li_start_result = iuo_pipe_logistics.Start &
    (itrans_source,itrans_destination,dw_pipe_errors)
```

In this example, no value is provided for the pipeline's retrieval argument. As a consequence, the Start function prompts the user for it, as indicated by dialog 1530 in FIG. 15B.

2. Testing the result

The following lines of code in the Clicked event of cb_write check the Start function's return value. This lets the application know whether it succeeded or not (and if not, what went wrong):

```
CHOOSE CASE li_start_result
    CASE -3
        Beep (1)
        MessageBox("Piping Error", &
            "Quarterly_Extract table already exists . . .
        RETURN
    CASE -4
        Beep (1)
        MessageBox("Piping Error", &
            "Quarterly_Extract table does not exist . . .
        RETURN
END CHOOSE
```

G. Monitoring pipeline progress

Testing the Start function's return value is not the only way to monitor the status of pipeline execution. Another technique a user can use is to retrieve statistics that a user's supporting user object keeps concerning the number of rows processed. They provide a live count of (1) the rows read by the pipeline from the source tables; (2) the rows written by the pipeline to the destination table or to the error DataWindow control; and (3) the rows in error that the pipeline has written to the error DataWindow control (but not to the destination table). By retrieving these statistics from the supporting user object, a user can dynamically display them in the window and enable users to watch the pipeline's progress.

H. Canceling pipeline execution

In many cases, a user will want to provide users (or a user's application itself) with the ability to stop execution of a pipeline while it is in progress. For instance, a user might want to give users a way out if they start the pipeline by mistake or if execution is taking longer than desired (e.g., because a large number of rows are involved).

To cancel pipeline execution, the user adds a Cancel function in an appropriate script, making sure that either the user or a user's application can execute this function (if appropriate) once the pipeline has started. When Cancel is executed, it stops the piping of any more rows from that moment on. Rows that have already been piped up to that moment may or may not be committed to the destination table, depending on the Commit attribute a user specified when building his/her pipeline object in the Data Pipeline painter.

For the Anchor Bay Nut Company example, pipeline execution is canceled in the Order Entry application as follows. During design of the w_sales_extract window, the user included the cb_stop CommandButton control. The application's scripts included code to enable this CommandButton when pipeline execution starts and to disable it when the piping is done. Additionally, the Clicked event of cb_stop is associated with a script which calls the Cancel function and tests whether or not it worked properly:

```
IF iuo_pipe_logistics.Cancel( ) = 1 THEN
    Beep (1)
    Message Box("Operation Status", &
        "Piping stopped (by a user's request).")
ELSE
    MessageBox("Operation Status", &
        "Error when trying ta stop piping.")
END IF
```

Together, these features let a user of the application click the cb_stop CommandButton to cancel a pipeline that is currently executing.

I. Committing updates to the database

When a pipeline object executes, it commits updates to the destination table according to a user's specifications in the Data Pipeline painter. A user does not need to write any COMMIT statements in his/her application's scripts to do this. For instance, both of the pipeline objects in the sample Order Entry application (pipe_sales_extract1 and pipe_ sales_extract2) are defined in the Data Pipeline painter to commit all rows. As a result, the Start function (or the Repair function, described below) will pipe every appropriate row and then issue a commit. Alternatively, the user can define a pipeline object that periodically issues commits as rows are being piped, such as after every 10 or 100 rows.

If the Cancel function is called, the Commit attribute in the Data Pipeline painter determines what to do, as follows.

| If a user's Commit value is | Then Cancel does this |
| --- | --- |
| All | Rolls back every row that was piped by the current Start function (or Repair function) |
| A particular number of rows (such as 1, 10, or 100) | Commits every row that was piped up to the moment of cancellation |

This is the same commit/rollback behavior that occurs when a pipeline reaches a Max Errors limit (which is also specified in the Data Pipeline painter).

J. Handling row errors

When a pipeline executes, it may be unable to write particular rows to the destination table. This can happen, for instance, with a row that has the same primary key as a row already in the destination table.

1. Using the pipeline-error DataWindow

Figure 16:
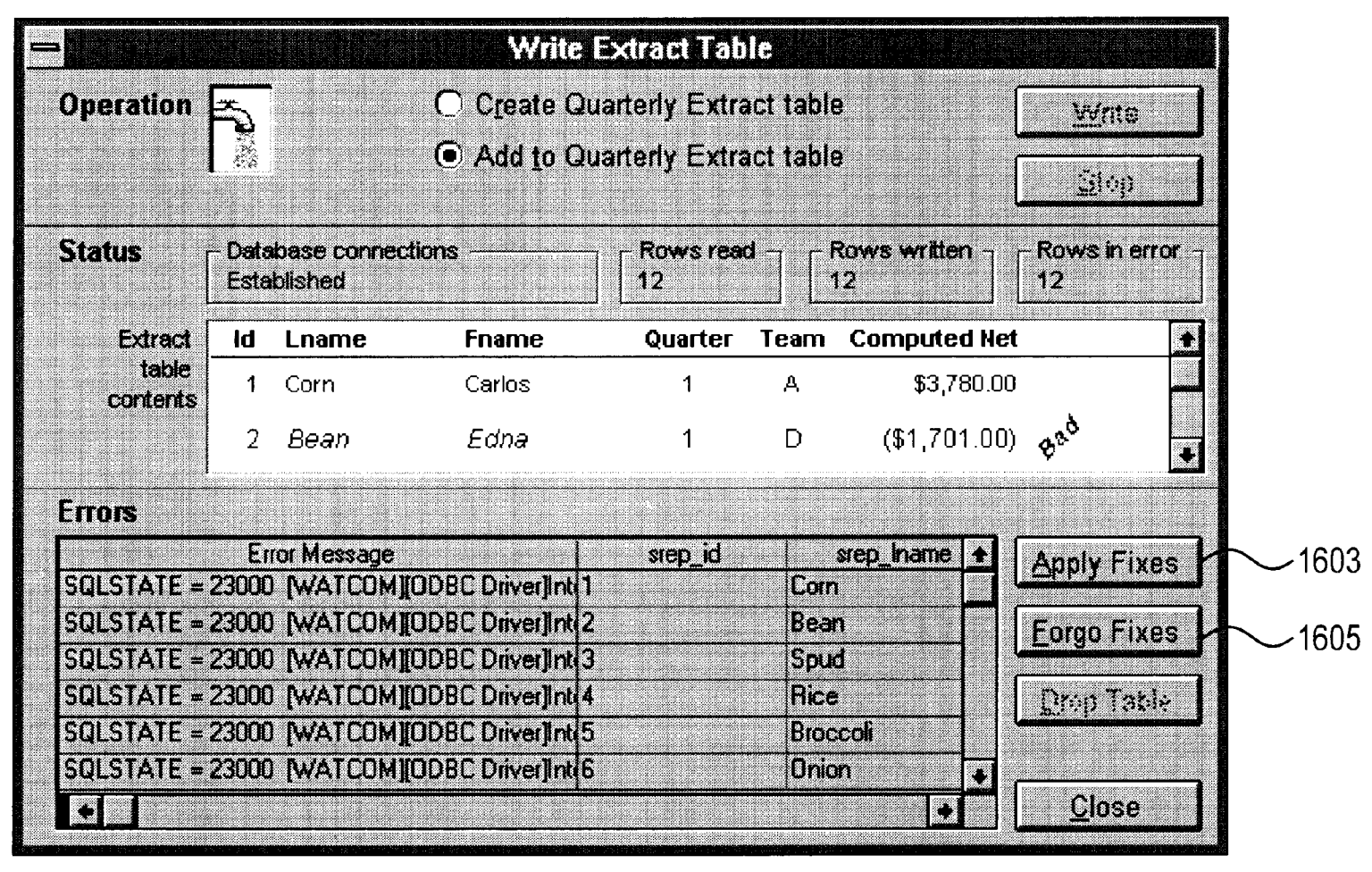

To help a user handle such error rows, the pipeline places them in the DataWindow control a user painted in his/her window and specified in the Start function. It does this by automatically associating its own special DataWindow object (the PowerBuilder pipeline-error DataWindow) with a user's DataWindow control. Consider what happens in the sample Order Entry application. When a pipeline executes in the w_sales_extract window, the Start function places all error rows in the dw_pipe_errors DataWindow control, as illustrated in FIG. 16. The control includes an error message column to identify the problem with each row.

Once there are error rows in a user's DataWindow control, a user needs to decide what to do with them. A user's alternatives include "repairing" some or all of those rows or "abandoning" some or all of those rows.

2. Repairing error rows

In many situations, it is appropriate to try fixing error rows so that they can be applied to the destination table. Making these fixes typically involves modifying one or more of their column values so that the destination table will accept them. This can done by letting the user edit one or more of the rows in the error DataWindow control, or by executing script code in a user's application that edits one or more of the rows in the error DataWindow control for the user. In either case, the next step is to apply the modified rows from this DataWindow control to the destination table. To apply row repairs to the destination table, the user adds a Repair function in an appropriate script. In this function, a user will specify a transaction object for the destination database. The results of the Repair function are tested for success.

Suppose, for the Anchor Bay Nut Company example, that users are allowed to edit the contents of the dw_pipe_errors DataWindow control to fix error rows that appear. Accordingly, a mechanism must be provided to end users to apply those modified rows to the destination table. When painting the w_sales_extract window, a CommandButton control named cb_applyfixes is added (shown at 1603 in FIG. 16). Script commands are added to enable this CommandButton when dw_pipe_errors contains error rows and to disable it when no error rows appear. A script for the Clicked event of cb_applyfixes is created. The following script calls the Repair function and tests whether or not it worked properly.

```
IF iuo_pipe_logistics.Repair(itrans_destination) &
                                      <> 1 THEN
    MessageBox("operation Status", &
               "Error when trying to apply fixes.")
END IF
```

The Repair function commits (or rolls back) database updates in the same way that the Start function does. The end user of the application can click the cb_applyfixes CommandButton to try updating the destination table with one or more corrected rows from dw_pipe_errors. If appropriate, a user can cancel pipeline execution while row repairs are being applied.

Sometimes after the Repair function has executed, there may still be error rows left in the error DataWindow control. This may be because these rows were modified by the user or application, but still have errors; were not modified by the user or application; or were never written to the destination table because the Cancel function was called (or were rolled back from the destination table following the cancellation). At this point, the user or application can try again to modify these rows and then apply them to the destination table with the Repair function. Alternatively, the end user can abandon one or more of these rows.

3. Abandoning error rows

In some cases, end user should be enabled to completely discard one or more error rows from the error DataWindow control. This can be useful for dealing with error rows that are not desirable to repair. Techniques a user can use for abandoning such error rows include these:

| If a user wants to abandon | Use |
| --- | --- |
| All error rows in the error DataWindow control | The Reset function |
| One or more particular error rows in the error Data Window control | The RowsDiscard function |

For the Anchor Bay Nut Company example, suppose end users can abandon all error rows in the dw_pipe_errors DataWindow control. This is implemented as follows. When painting the w_sales_extract window, the designing user includes a CommandButton control named cb_forgofixes, shown at 1605 in FIG. 16. Code is added to the application's scripts to enable this CommandButton when dw_pipe_errors contains error rows and to disable it when no error rows appear. A script for the Clicked event of cb_forgofixes is added. This script calls the Reset function as follows.

dw_pipe_errors.Reset ( )

Together, these features let an end user of the application click the cb_forgofixes CommandButton to discard all error rows from dw_pipe_errors.

K. Final housekeeping

After a user's application is all done processing pipelines, the resources obtained at the beginning to support pipeline execution are released. This occurs as follows. The instance that a user created of his/her supporting user object is destroyed. To do this, a DESTROY statement is added in an appropriate script, specifying the name of the variable that contains that user-object instance. The application disconnects from the pipeline's source and destination databases. To do this, two DISCONNECT statements are added in an appropriate script. In one, the name of the variable that contains a user's source transaction-object instance is specified. In the other, the name of the variable that contains a user's destination transaction-object instance is specified. The results of each DISCONNECT statement are tested.

A user's source transaction-object instance and a user's destination transaction-object instance are destroyed. This is done by adding two DESTROY statements in an appropriate script. In one, the name of the variable that contains a user's source transaction-object instance is specified. In the other, the name of the variable that contains a user's destination transaction-object instance is specified.

For the Anchor Bay Nut Company example, cleanup entails adding code for the Close event of the w_sales_extract window. At the beginning of this script, the following statement is added to destroy the instance of the user object u_sales_pipe_logistics (which is stored in the iuo_pipe_logistics variable).

DESTROY iuo_pipe_logistics

To disconnect from the source database, the following statements are added to disconnect from the source database, test the result of the disconnection, and destroy their source transaction-object instance (which is stored in the itrans_source variable).

```
DISCONNECT USING itrans_source;
    // Check result of DISCONNECT statement.
IF itrans_source.SQLCode = -1 THEN
    MessageBox("Database Connection Error"&
        "Problem when disconnecting from ", +&
        "the source (Sales) database. " +&
        "Please call the Anchor Bay support team." +&
        "~n~r~n~rDetails follow: " +&
        String(itrans_source.SQLDBCode) + " " +&
        itrans_source.SQLErrText)
END IF
DESTROY itrans_source
```

To disconnect from the destination database, the following statements are added to disconnect from the destination database, test the result of the disconnection, and destroy the destination transaction-object instance (which is stored in the itrans_destination variable).

```
DISCONNECT USING itrans_destination;
    // Check result of DISCONNECT statement.
IF itrans_destination.SQLCode = -1 THEN
    MessageBOX("Database Connection Error", &
        "problem when disconnecting from " +&
        "the destination (Sales) database. " +&
        "Please call the Anchor Bay support team." +&
        "~n~r~n~rDetails follow: " +&
        String(itrans_destination.SQLCode) + " " +&
        itrans_destination.SQLErrText)
END IF
DESTROY itrans_destination
```

L. Methodology summary

A method of the present invention for copying (or moving) data from a source data source to a destination data source, comprises selecting source and destination database profiles for the source and destination data sources, each profile comprising sufficient information for supporting a connection to a respective one of the data sources, establishing a connection to the source and destination data sources, displaying a graphical user interface for graphically defining a pipeline object, the pipeline object specifying copying of data from the source data source to the destination data source, saving the pipeline object to a storage device, and copying data from the source data to the destination data by executing the pipeline object.

Appended herewith as Microfiche Appendix A are source listings providing additional description of the present invention. Further description is provided in PowerBuilder Chapter 12: *Piping Data Between Data Sources*, pp. 361–389, appended as Appendix C in the provisional parent application. Additional description is provided in Horwith, M., *The Pipeline Object Eases Batch Data Updates*, Data-based Adviser, November 1995, appended as Appendix D in the provisional parent application. Still further description is provided in PowerBuilder Chapter 2: *Designing an Application*, pp. 19–77, appended as Appendix A in the provisional parent application.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method for copying data from one data source to another, the method comprising:

selecting source and destination database profiles for source and destination data sources, respectively, each profile comprising sufficient information for supporting a connection to a respective one of the source and destination data sources;

establishing a connection to said source and destination data sources;

displaying a graphical user interface for graphically defining a pipeline object, said pipeline object specifying particular data to copy from the source data source to the destination data source;

saving said pipeline object to a storage device, so that it can be executed upon invocation; and copying data from the source data to the destination data by executing said pipeline object;

wherein displaying a graphical user interface step includes:

receiving user input for graphically creating a SQL SELECT statement which specifies the data to be copied from the source data to the destination data.

2. The method of claim 1, wherein displaying a graphical user interface step includes:

specifying that copying of data from the source data source to the destination data source includes appending the data to the destination data source.

3. The method of claim 1, wherein displaying a graphical user interface step includes:

specifying that copying of data from the source data source to the destination data source includes updating the destination data source.

4. The method of claim 1, wherein displaying a graphical user interface step includes:

specifying that copying of data from the source data source to the destination data source includes creating a new database table at the destination data source.

5. The method of claim 1, wherein said pipeline object executes in response to invocation from a user-supplied script.

6. The method of claim 1, wherein said source data source comprises a first set of database tables and wherein said destination data source comprises a second set of database tables, each set residing on different servers.

7. The method of claim 1, wherein said data being copied comprises database rows selected from the source data source.

8. The method of claim 7, further comprising:

determining error rows, said error rows comprising those rows, if any, selected from the source data source would, if copied, lead to errors in the destination data source; and foregoing any copying of such error rows.

9. The method of claim 8, further comprising:

displaying a user interface dialog allowing an end user at runtime to perform a selected one of repairing some or all such error rows or abandoning some or all such error rows.

\* \* \* \* \*